United States Patent [19]
Mukai et al.

[11] Patent Number: 5,557,358
[45] Date of Patent: Sep. 17, 1996

[54] CAMERA HAVING AN ELECTRONIC VIEWFINDER FOR DISPLAYING AN OBJECT IMAGE UNDER DIFFERENT PHOTOGRAPHIC CONDITIONS

[75] Inventors: Hiromu Mukai; Yasuo Maeda, both of Kawachinagano; Shigeto Ohmori; Jun Ishihara, both of Sakai, all of Japan

[73] Assignee: Minolta Camera Kabushiki Kaisha, Osaka, Japan

[21] Appl. No.: 265,629

[22] Filed: Jun. 24, 1994

Related U.S. Application Data

[62] Division of Ser. No. 959,264, Oct. 9, 1992, abandoned.

[30] Foreign Application Priority Data

| Oct. 11, 1991 | [JP] | Japan | 3-292318 |
| Dec. 16, 1991 | [JP] | Japan | 3-353515 |
| Dec. 16, 1991 | [JP] | Japan | 3-353516 |
| Dec. 18, 1991 | [JP] | Japan | 3-354780 |
| Dec. 18, 1991 | [JP] | Japan | 3-354781 |

[51] Int. Cl.⁶ ........................... G03B 13/02
[52] U.S. Cl. ........................... 354/219; 348/333
[58] Field of Search ................ 354/219, 222; 348/333, 341

[56] References Cited

U.S. PATENT DOCUMENTS

| 3,212,422 | 10/1965 | Nerwin et al. | 354/222 X |
| 4,589,031 | 5/1986 | Tsuji | 358/224 X |
| 4,655,576 | 4/1987 | Yuasa et al. | 354/474 X |
| 4,873,576 | 10/1989 | Hattori et al. | 348/333 |
| 4,884,089 | 11/1989 | Taniguchi et al. | 354/222 |
| 5,014,078 | 5/1991 | Kudo et al. | 354/195.1 |
| 5,023,650 | 6/1991 | Hoshino et al. | 354/219 X |
| 5,138,460 | 8/1992 | Egawa | 348/333 X |
| 5,164,833 | 11/1992 | Aoki | 348/333 |
| 5,172,151 | 12/1992 | Yomogizawa et al. | 354/219 |
| 5,172,234 | 12/1992 | Arita et al. | 358/224 |
| 5,196,877 | 3/1993 | Mukai et al. | 354/195.12 |

FOREIGN PATENT DOCUMENTS

| 64-39172 | 2/1989 | Japan |
| 1-107240 | 4/1989 | Japan |
| 2-46414 | 2/1990 | Japan |
| 2-103006 | 4/1990 | Japan |
| 2-103005 | 4/1990 | Japan |
| 2-103022 | 4/1990 | Japan |
| 3-259232 | 11/1991 | Japan |
| 4-96028 | 4/1992 | Japan |

Primary Examiner—Michael L. Gellner
Assistant Examiner—J. K. Han
Attorney, Agent, or Firm—Burns, Doane, Swecker & Mathis, LLP

[57] ABSTRACT

A camera has an electronic viewfinder for displaying an image of a subject to be photographed in accordance with image data from a scene. The displayed image encompasses an area larger than that of the scene to be photographed, to enable the camera user to view objects and events outside of the photographic frame. In addition, the image data can be processed in accordance with differing photographic conditions, such as changes in shutter speed, aperture or electronic flash emission, to permit the user to view the changes that occur under the differing conditions.

16 Claims, 41 Drawing Sheets

Fig. 20

- #450 Monitoring routine
- #452 Input Ev value
- #454 Tv mode ON ?
  - YES → #456 Tvp = Ev - Avp
    - #458 Read Tvp image information
    - #460 Read Tvp±α image information
  - NO → #462 Avp = Ev - Tvp
    - #464 Read Avp image information
    - #466 Avp±α image information
- #468 Return

CAMERA HAVING AN ELECTRONIC VIEWFINDER FOR DISPLAYING AN OBJECT IMAGE UNDER DIFFERENT PHOTOGRAPHIC CONDITIONS

This divisional of application Ser. No. 07/959,264, filed Oct. 9, 1992, now abandoned.

BACKGROUND OF THE INVENTION

1. Field of the Invention

The present invention relates to a camera having an electronic viewfinder.

2. Description of the Prior Art

As well as cameras having conventionally-used optical viewfinders, a large number of cameras have been proposed which have electronic viewfinders (hereinafter referred to as EVF) that sense an image within a photographing area by use of an image sensing device such as a CCD (charge coupled device) to display the image in a liquid crystal display.

The sensing of an image in a photographing area is performed, for example, by light having passed through a taking lens as disclosed by Japanese laid-open Patent Application No. H2-14675. In a camera where an image is sensed by an image sensing device based on light having passed through a taking lens as described above, the image sensed by the image sensing device is displayed in the finder. As a result, an angle of view of the taking lens equals an angle of view displayed in the finder. However, if the angle of view of the taking lens equals an angle of view displayed in the finder, the user cannot know what lies outside the finder field in confirming a subject through a finder to decide the composition of the image to be photographed. As a result, the user may hesitate to decide the scene composition. Moreover, the resulting photograph may be considered a failure if an unseen person or a car suddenly comes into the finder field from outside the field.

SUMMARY OF THE INVENTION

An object of the present invention is to provide a camera with which a subject image of an angle of view wider than that of a taking lens can always be confirmed through a finder.

To achieve the above-mentioned object, a camera according to the present invention is provided with a taking lens for forming a subject image of a predetermined angle of view on a predetermined image formed surface, an image sensing device, an optical system for forming on the image sensing device a subject image of an angle of view wider than that of the image formed on the predetermined image formed surface by the taking lens, and an electronic viewfinder for monitoring the subject image formed on the image sensing device.

With such a feature, a subject image of an angle of view wider than that of the taking lens can always be formed in the finder. As a result, the user can decide a photographing composition easily compared to a case where only an image within a photographing area can be confirmed.

BRIEF DESCRIPTION OF THE DRAWINGS

This and other objects and features of this invention will become clear from the following description, taken in conjunction with the preferred embodiments with reference to the accompanied drawings in which:

FIG. 20 is a flow chart of a monitoring routine;

DESCRIPTION OF THE PREFERRED EMBODIMENTS

Embodiments of the present invention will hereinafter be described with reference to the drawings.

Figure 1:
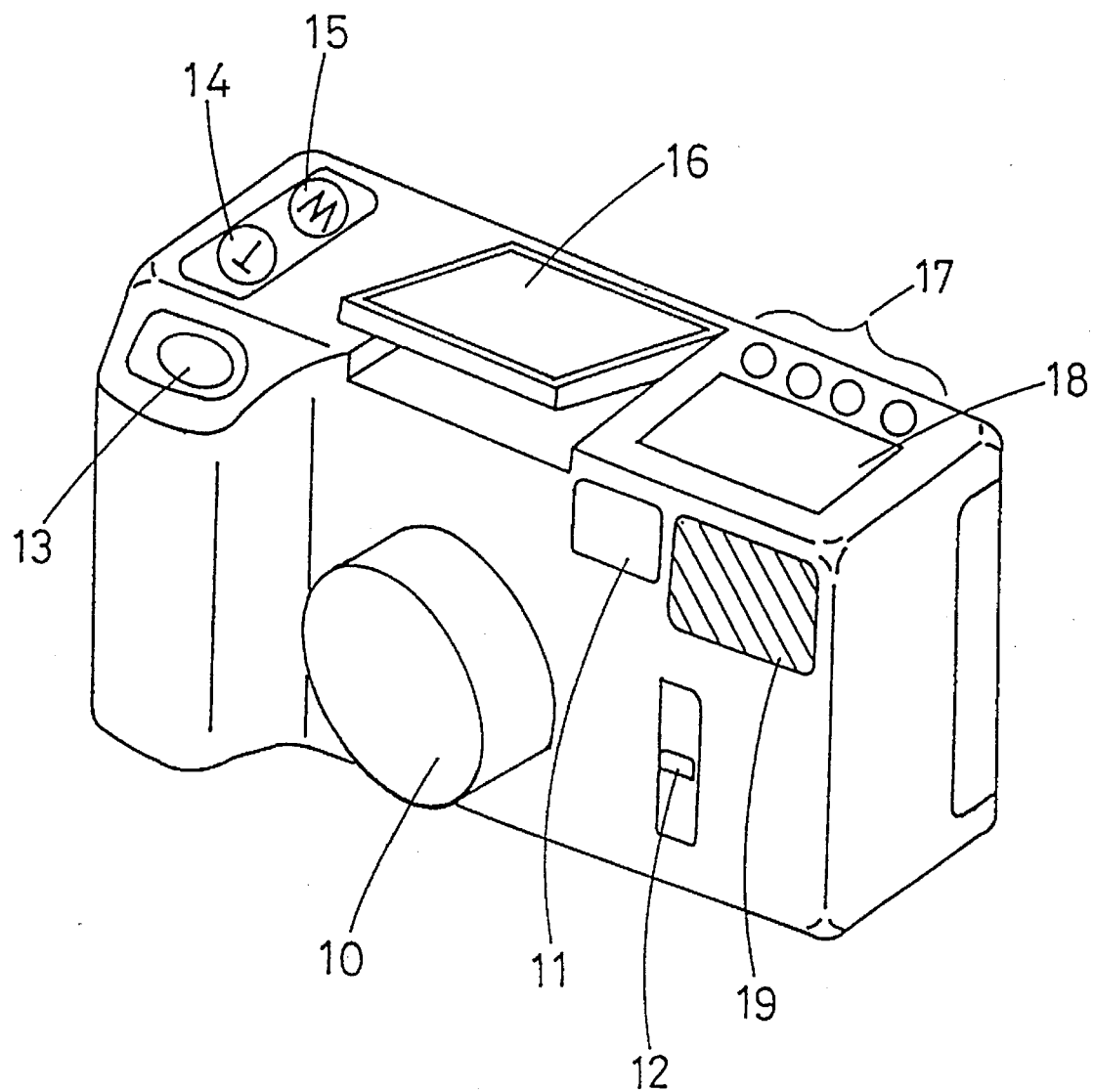
FIG. 1 shows the appearance of a camera.

FIG. 1 shows the appearance of a camera (hereinafter referred to as compact camera) where a taking lens and a finder optical system are separately provided. A taking lens 10 and a finder lens 11 are provided. Numeral 12 is a main switch. Numeral 13 is a release button. Zooming of the taking lens 10 is performed by operating a zoom button 14 or 15. An electronic viewfinder (hereinafter referred to as EVF) 16, which can be canted down by a given angle, is made of a liquid crystal plate. Setting of various modes, which will subsequently be described, is performed by operating setting buttons 17. An information displaying liquid crystal plate 18 displays information on film sensitivity, counter and exposure. Numeral 19 is a flash light emitting portion.

Figure 2:
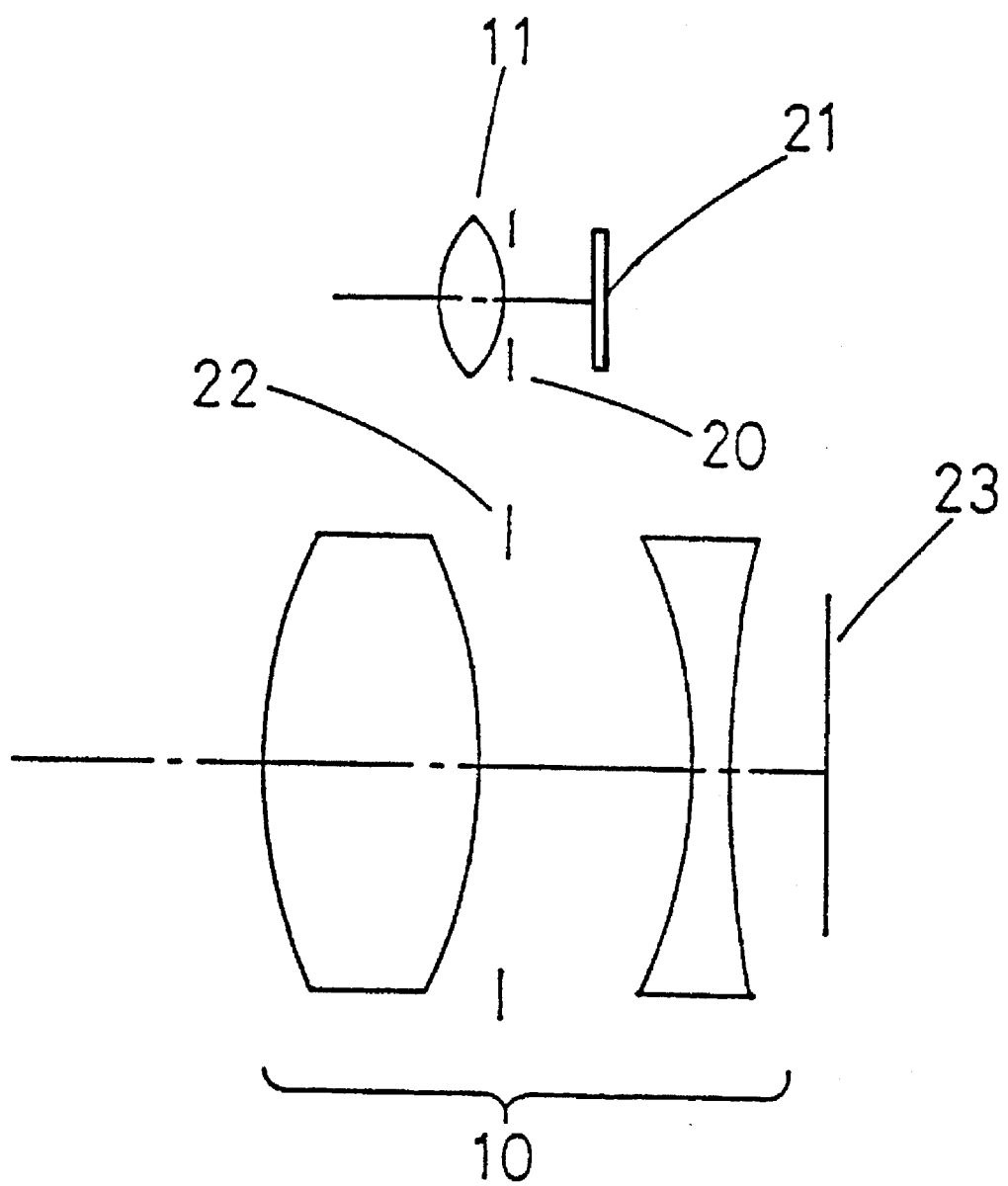
FIG. 2 is a side view of a taking lens optical system and a side view of a finder optical system.

FIG. 2 shows a side view of a taking optical system and a side view of a finder optical system. The finder lens 11 is a fixed focal length lens. Light having passed through the finder lens 11 is directed through an aperture 20 to an EVF CCD 21 which transmits image information to the EVF 16. The aperture 20 is provided to control the amount of exposure to the CCD 21. The taking lens 10 is a two-unit zoom lens as shown in FIG. 2. Light having passed through the taking lens 10 exposes film 23. An aperture 22 moves together with a first lens unit (shown as a concave lens) arranged on the left in FIG. 2. While each unit is shown as one lens for simplicity, it may includes a plurality of lens elements. The finder lens 11 may also includes a plurality of lens elements.

Figure 3A:
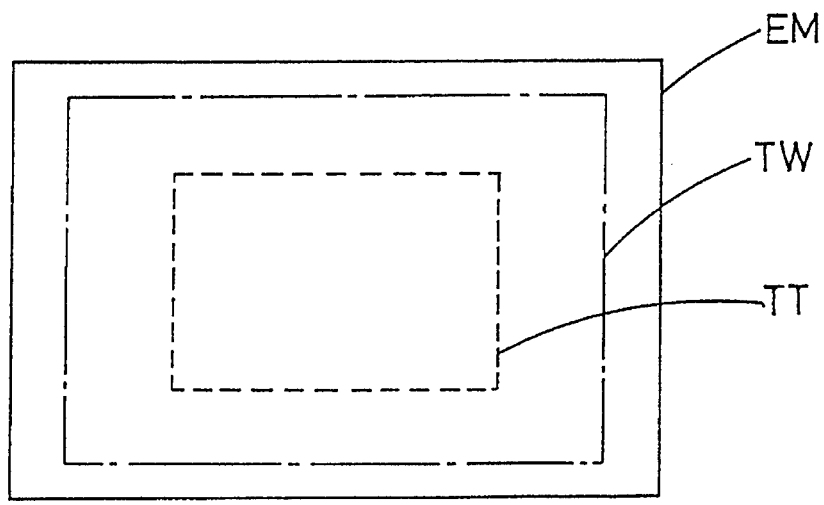
FIG. 3A shows a correlation between a monitor area and actually photographed areas in an electronic viewfinder.
Figure 3B:
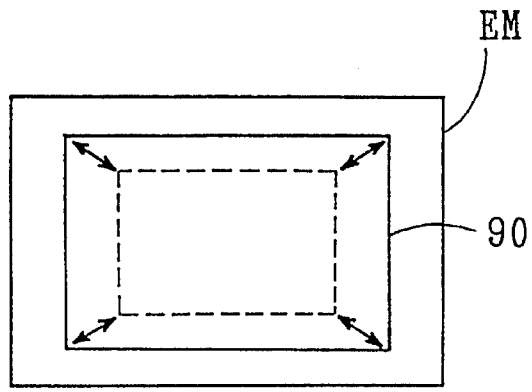
FIGS. 3B and 3C show a first and a second display methods of the electronic viewfinder, respectively.
Figure 3C:
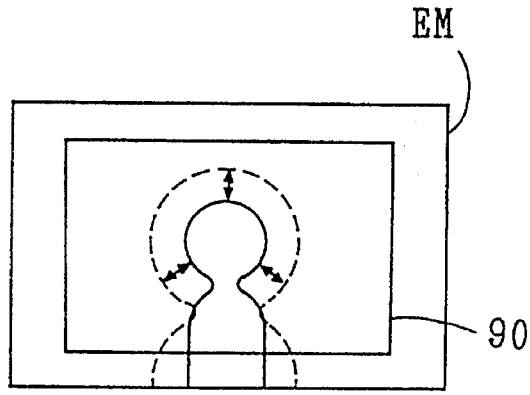

FIG. 3A shows a correlation between a monitor area given by the EVF and actually photographed areas in the EVF 16. TT represents a photographed area at a longest focal length condition. TW represents a photographing area at a shortest focal length condition. EM represent an EVF monitor area. The finder lens 11 is designed so that image information relating to an angle of view larger than a maximum angle of view of the taking lens 10 is provided to the EVF CCD 21. This can be realized by appropriately choosing focal lengths of the taking lens 10 and finder lens 11. The CCD 21 is always provided with information on an area larger than an actually photographed area. The display in the EVF 16 can be provided in any of the following manners:

1) to display all the information provided to the CCD 21 and to display with an area frame 90 an area variation caused by zooming of the taking lens 10 as shown in FIG. 3B (that is, the image plane displays an area larger than that obtained at a wide limit [shortest focal length condition] in a fixed condition, and the area frame 90 is moved through zooming); and 2) to display with a fixed area frame 90 an area at a magnification larger than a predetermined magnification according to a view angle variation caused by zooming of the taking lens as shown in FIG. 3C (that is, the frame is fixed and the wide image plane is moved in accordance with zooming).

According to the manner 1), the image size (magnification) does not vary and only the frame varies. According to the manner 2), an area, of an image, sensed by the CCD 21 varies according to zooming of the taking lens 10, and according to the variation, the size (magnification) of the image varies. The EVF can be designed so that changeover of display manners between those of FIG. 3B and FIG. 3C is possible.

Figure 4A:
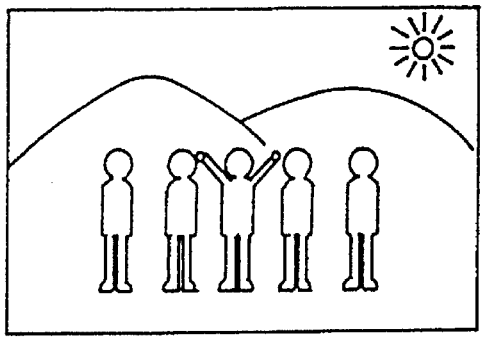
FIGS. 4A, 4B and 4C shows image information sensed by a CCD and photographed area frames.
Figure 4B:
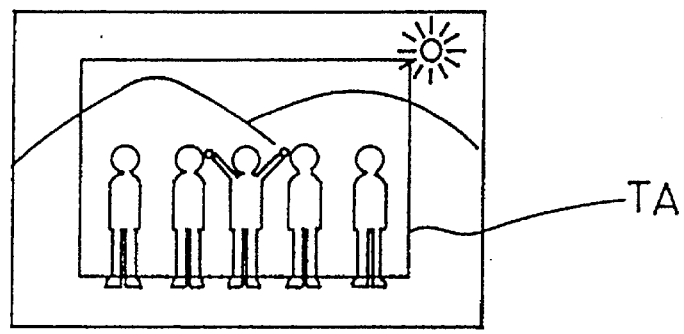
Figure 4C:
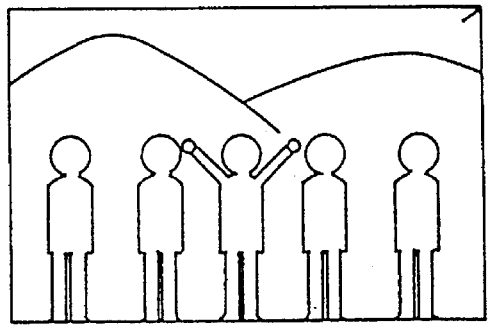

The EVF can be designed so that changeover of display manners between the display showing a photographing area (FIG. 4B) and a display showing only a photographing area (FIG. 4C) is possible. FIG. 4A shows an area sensed by the CCD 21. FIG. 4B shows a case where an area frame TA representing a view angle area of the taking lens 10 in the area shown in FIG. 4A. FIG. 4C shows a case where only a view angle area of the taking lens 10, that is, only the area within the area frame TA of FIG. 4B is shown. The displays of FIGS. 4B and 4C may automatically or manually be changed. In the case of automatic changeover, the display is shifted to the condition of FIG. 4C when a release switch (not shown) is turned on by depression of the release button 13. After exposure is completed, the display is returned to the condition of FIG. 4B. With this manner, the user can monitor an actually photographed area in enlarged condition. In the case of manual changeover, the display condition is changed over by operating the mode setting button 17 (FIG. 1).

Figure 5:
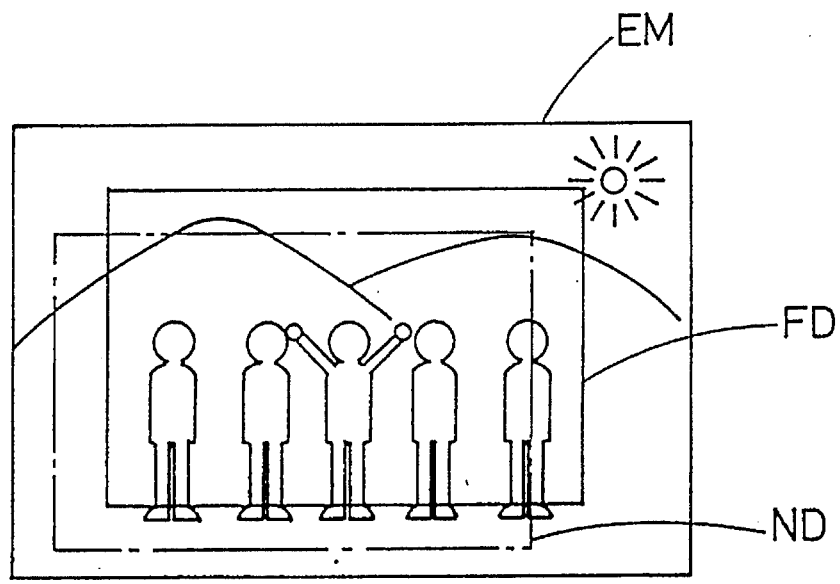
FIG. 5 shows a manner of correcting parallax.

It enables parallax correction, in photographing a close subject, that the CCD 21 senses an image larger than an actually photographed area. For the parallax correction, the display area of the EVF 16 is shifted. In FIG. 5, EM represents an area displayed by the EVF 16, FD represents an EVF display area in photographing a distant subject, and ND represents an EVF display area in photographing a close subject. The area frame ND shifted by parallax is displayed based on AF distance information. The area frame is automatically shifted to the area frame FD based on subject distance information, or based on focal length information and subject distance information, that is, magnification information.

Figure 6:
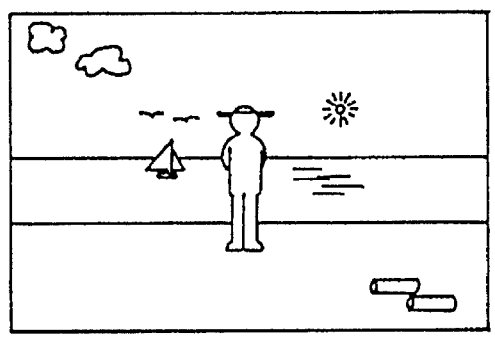
FIG. 6 shows a normal electronic view finder image plane.

A case will be described where a display representing portions other than the field frame display is provided in the EVF 16. FIG. 6 shows an example of an EVF image plane in normal photographing. This example has a composition including a person standing on the beach, objects (lumbers) placed in front of the person and objects (the sea, the sun, clouds, a yacht, birds) located behind the person. In photographing a panoramic picture for this composition, by using either of the three display examples shown in FIGS. 7A, 7B and 7C, borders between the photographed area and areas outside the photographed area can clearly be displayed. As a result, the user can easily monitor the balance of the composition in the photographed area.

Figure 7A:
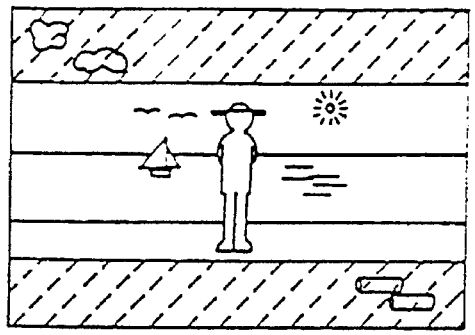
FIGS. 7A, 7B and 7C show electronic view finder image planes in panoramic photographing.
Figure 7B:
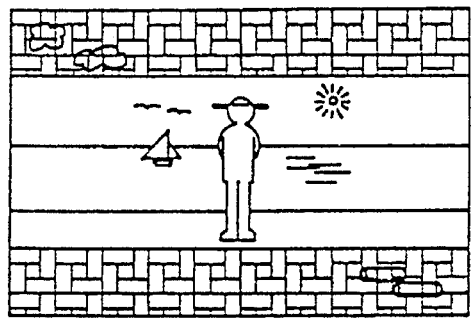
Figure 7C:
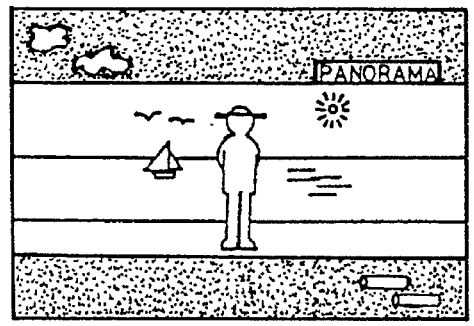

FIG. 7A shows an example where the color tone is changed. The photographed area is not changed in color tone. Areas outside the photographed area is displayed in a single color, for example, red and green, or in a complementary color of the color of the subject, or in black and white. FIG. 7B shows an example where a specific pattern is displayed outside the photographed area. As the pattern, one is used which has a depth and a density which do not obscure images outside the photographed area. FIG. 7C shows an example where areas outside the photographed area are negative-positive-reversed. The display can be provided both in color and in black and white.

Figure 8:
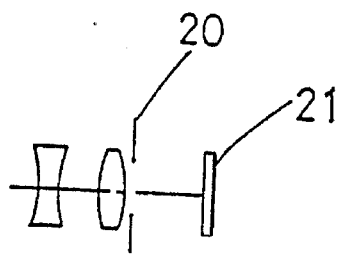
FIG. 8 is a side view of a finder portion provided with a zooming function.

FIG. 8 shows a finder portion of another example of the compact camera whose finder lens is provided with a zooming function. FIG. 8 corresponds to FIG. 2. However, the taking lens is not shown.

If the zooming ratio of the taking lens is too large, resolution deteriorates when a small view angle area is displayed based on EVF information as shown in FIG. 4C. As a result, the image viewed through the EVF is less clear. In that case, it is possible to maintain a high resolution by performing zooming of the finder. At this time, the angle of view must be larger than that of the taking lens. That is, during zooming, a predetermined relationship is maintained between the focal length of the taking lens and the focal length of the finder lens.

Figure 9:
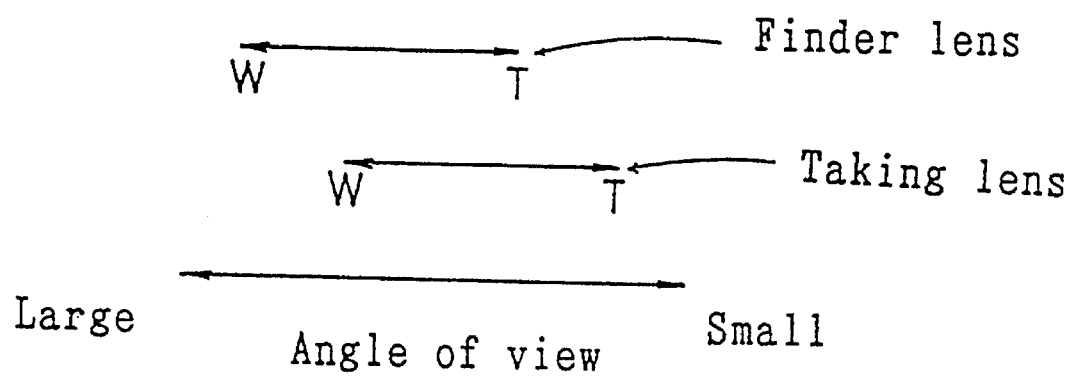
FIG. 9 shows a focal length range of a finder lens and that of a taking lens.

FIG. 9 shows a magnification range of the finder lens and a magnification range of the taking lens. While the zooming amount of the finder lens is the same as that of the taking lens in this example, the zooming amount of the finder lens may be smaller than that of the taking lens. The zooming ratio of the finder portion is decreased to reduce the size of the finder portion. When a variation in angle of view of the taking lens is $\theta(x)$, an angle of view $\theta'(x)$ of the finder portion is obtained by $$\theta'(x)=\theta(x)+\Delta\theta$$

where $\Delta\theta$ is a value which is constant irrespective of variation in angle of view.

Controls performed in the compact camera irrespective of whether or not the finder lens is provided with a zooming function will hereinafter be described.

Figure 10:
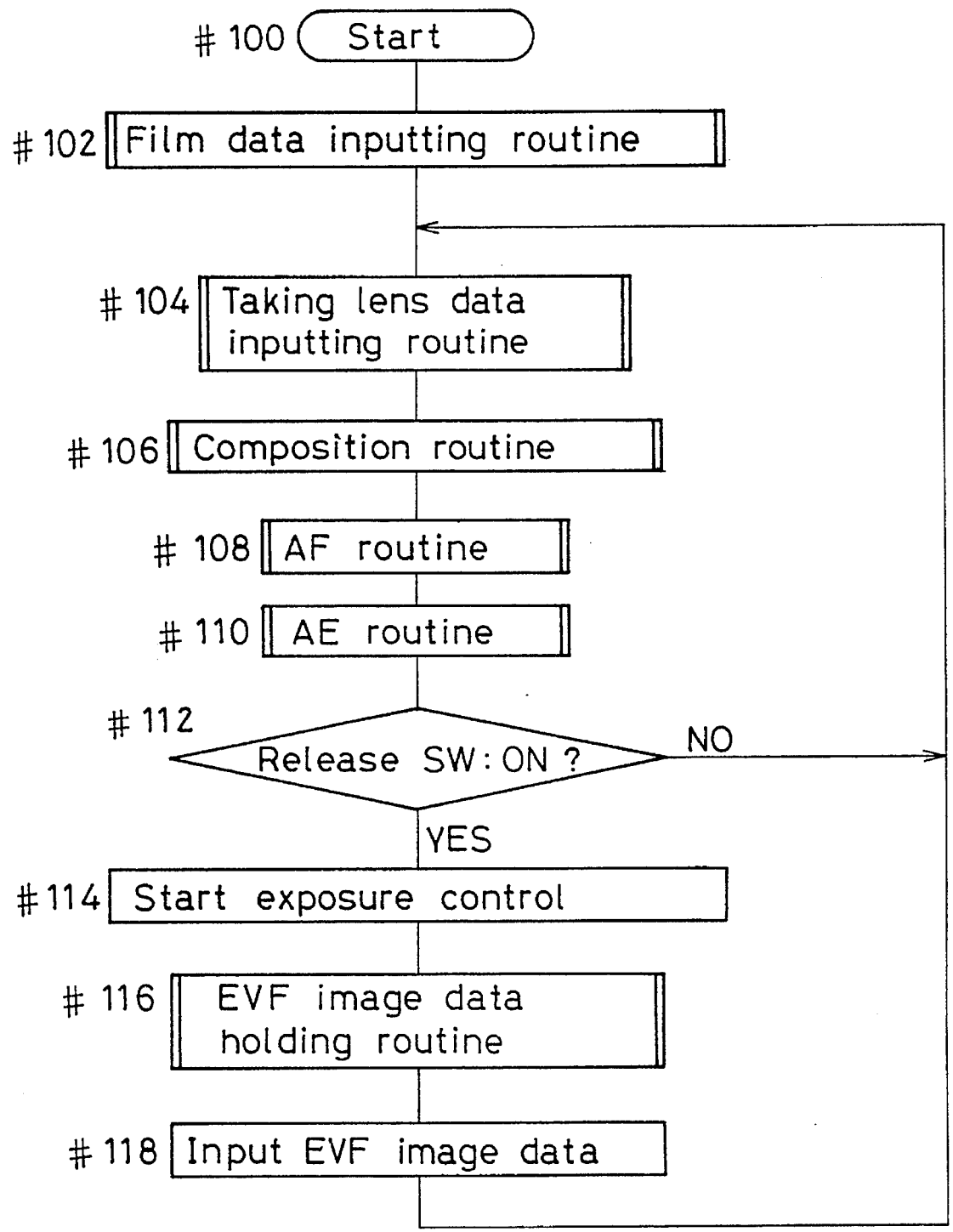
FIG. 10 is a flow chart of a main routine of control of the lens shutter camera.

FIG. 10 shows a flow chart of a main routine which is started when the power is turned on and is ended when exposure is completed.

The process is started when the power is turned on (step #100). A film data and a taking lens data are inputted to the camera at steps #102 and #104, respectively. Then, a composition routine for deciding a composition, an AF (automatic focusing) routine for focusing and an AE (automatic exposure) routine for deciding an exposure value (an aperture value and a shutter speed) are executed at steps #106, #108 and #110, respectively. At step #112, whether the release switch has been turned ON or not is determined. When it has not been turned ON, a flow from step #104 is repeated. When it has been turned ON, exposure control is started at step #114 to perform film exposure. At step #116, a subsequently-described EVF image data holding routine is executed simultaneously with the start of the exposure. At step #118, a new EVF image data is inputted. Thereafter, the flow from step #104 is repeated.

Concerning the AF routine of step #108, the AE routine of step #110 and the exposure control of step #114, description thereof will be omitted since they are the same as conventional ones.

Figure 11:
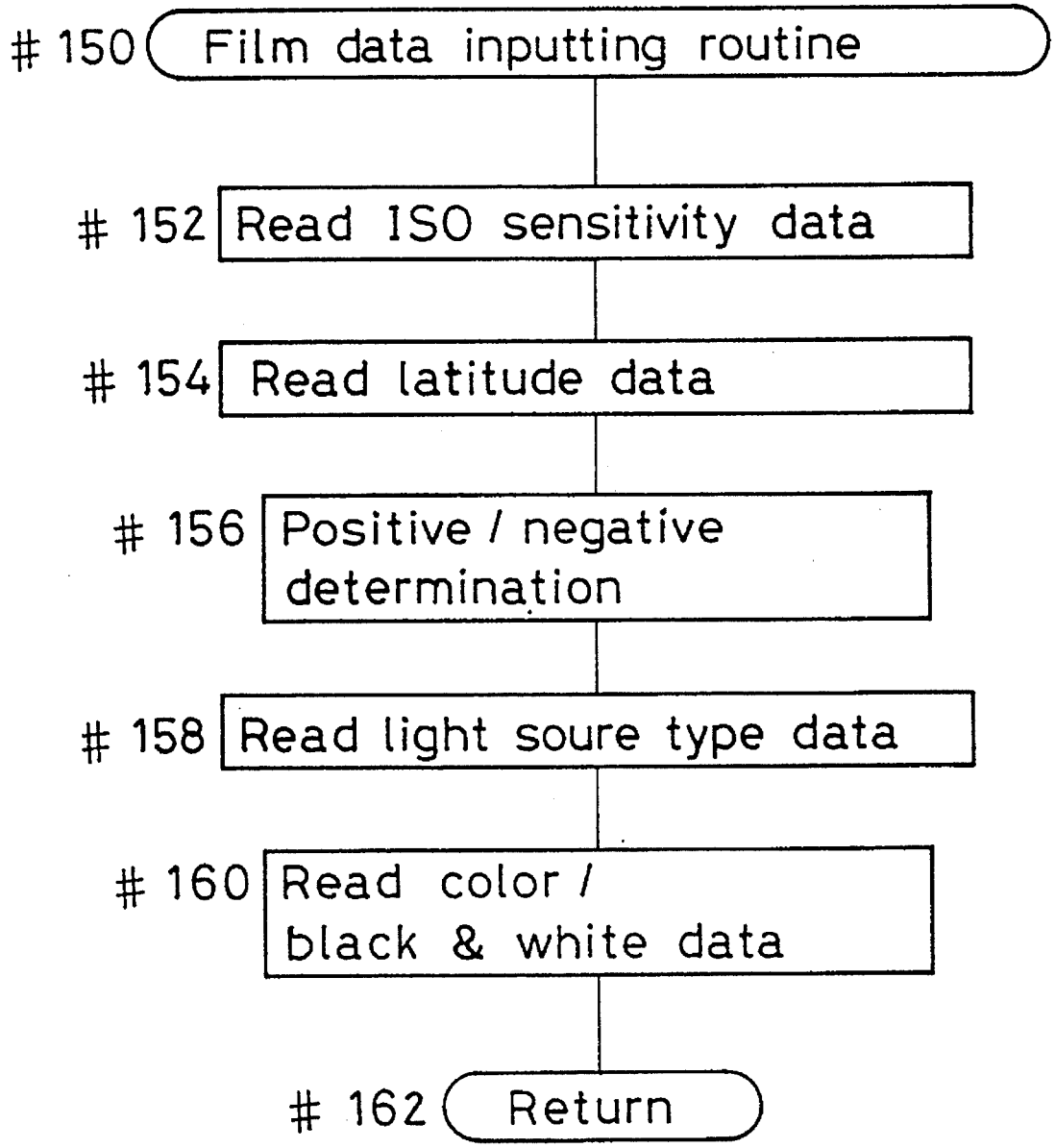
FIG. 11 is a flow chart of a film data inputting routine.

FIG. 11 is a flow chart of a film data inputting routine executed at step #102 of FIG. 10.

Film data are obtained by reading codes provided on the surface of a film cartridge. First, ISO sensitivity and latitude are read at steps #152 and #154, respectively. Then, at step #156, whether the film is negative film or positive film is determined based on the latitude data (positive film when the latitude is narrow, negative film when the latitude is wide). At steps #158 and #160, information on setting by the user's operation of the mode setting button 17 (FIG. 1) is checked. At step #158, whether the light source type set by the user is a daylight type or a tungsten type is determined. When the user has set the light source type, it is determined that the daylight type has been set. At step #160, whether the film type set by the user is color film or black and white film is determined. When the user has not set the film type, it is determined that the color film has been set. At step #162, the process returns to the main routine.

Figure 12:
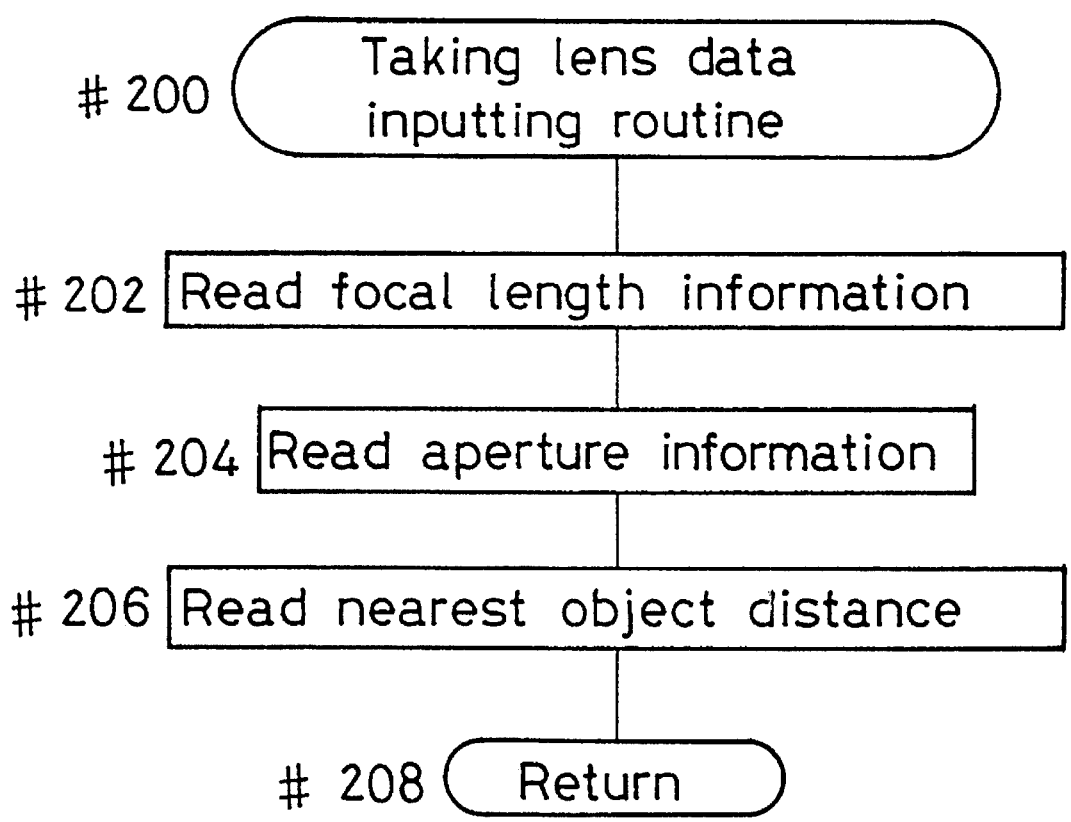
FIG. 12 is a flow chart of a taking lens data inputting routine.

FIG. 12 is a flow chart of a taking lens data inputting routine executed at step #104 of FIG. 10.

At step #202, focal length information is read. If the lens is a zoom lens, focal lengths at the longest and shortest focal length conditions and a focal length at the present lens position are inputted. At step #204, aperture value information is read. Aperture values at open aperture and at a most stopped down condition and the present aperture condition are read. At step #206, information on a nearest object distance and the present object distance is read. Strictly speaking, the object distance, which is inputted from an AF means (not shown), is not a lens data; however, it is read in this routine. At step #208, the process returns to the main routine.

Figure 13:
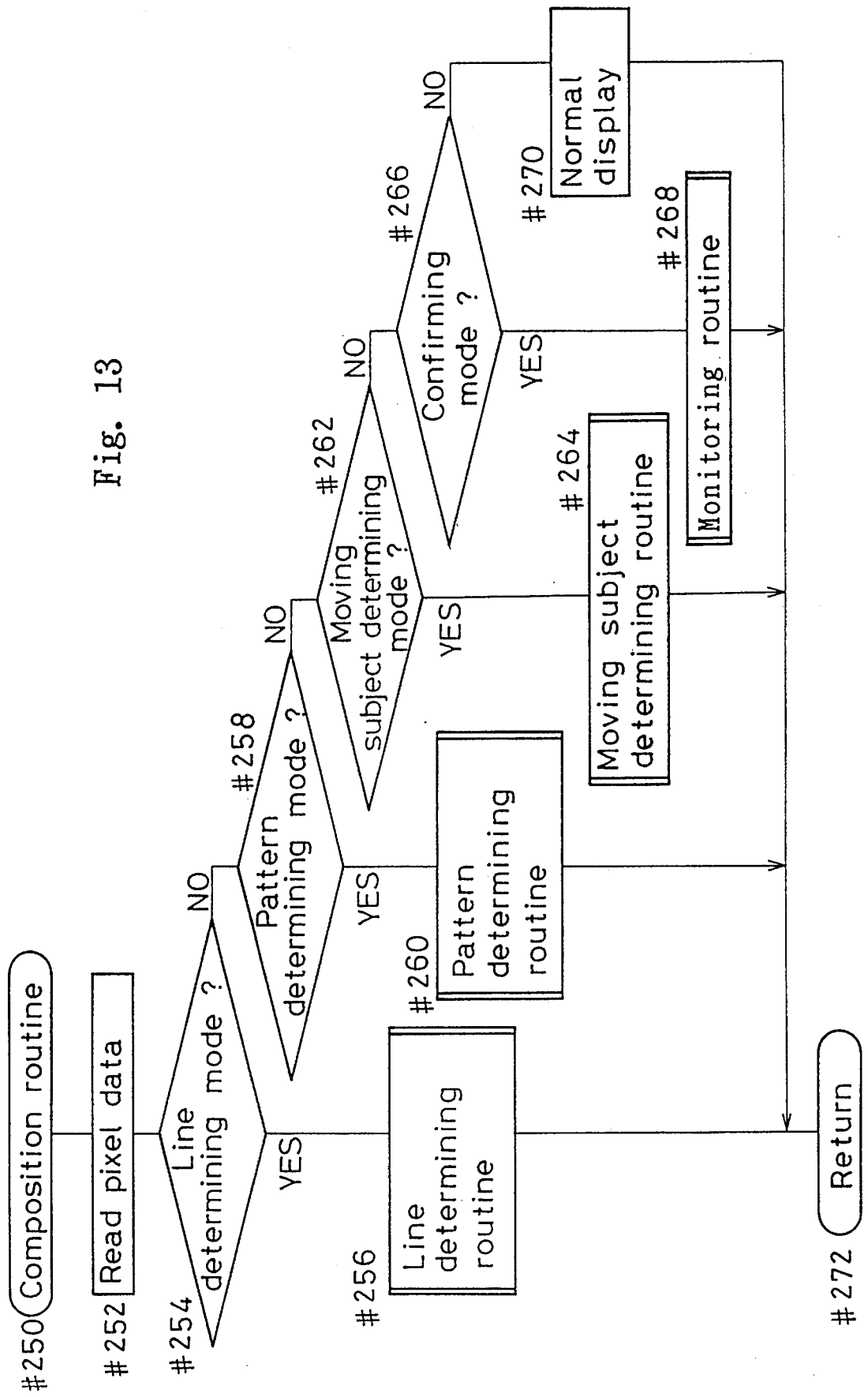
FIG. 13 is a flow chart of a composition routine.

FIG. 13 is a flow chart of the composition routine executed at step #106 of FIG. 10. This is a routine for deciding a composition.

At step #252, EVF CCD pixel data are read for a predetermined period of time. Then, determination of the mode set by the user is made based on the condition of the mode setting button 17 (FIG. 1) to execute a routine for the set mode. When a line determining mode has been set at step #254, a line determining routine is executed at step #256. When a pattern determining mode has been set at step #258, a pattern determining routine is executed at step #260. A moving subject determining routine and a monitoring routine are executed at steps #264 and #268, respectively, in a similar manner. When the user has not set any of these modes, the pixel data read at step #252 are directly transmitted to the EVF, and a normal display is provided at step #270. The previously-described displays of FIGS. 4A, 4B, 4C (the display of the image sensed by the CCD and the changeover between the area frame display and the display of only the area within the area frame) and 7A, 7B and 7C (panorama display in panoramic photographing) are included in the normal display of step #270. At step #272, the process returns to the main routine.

Figure 14:
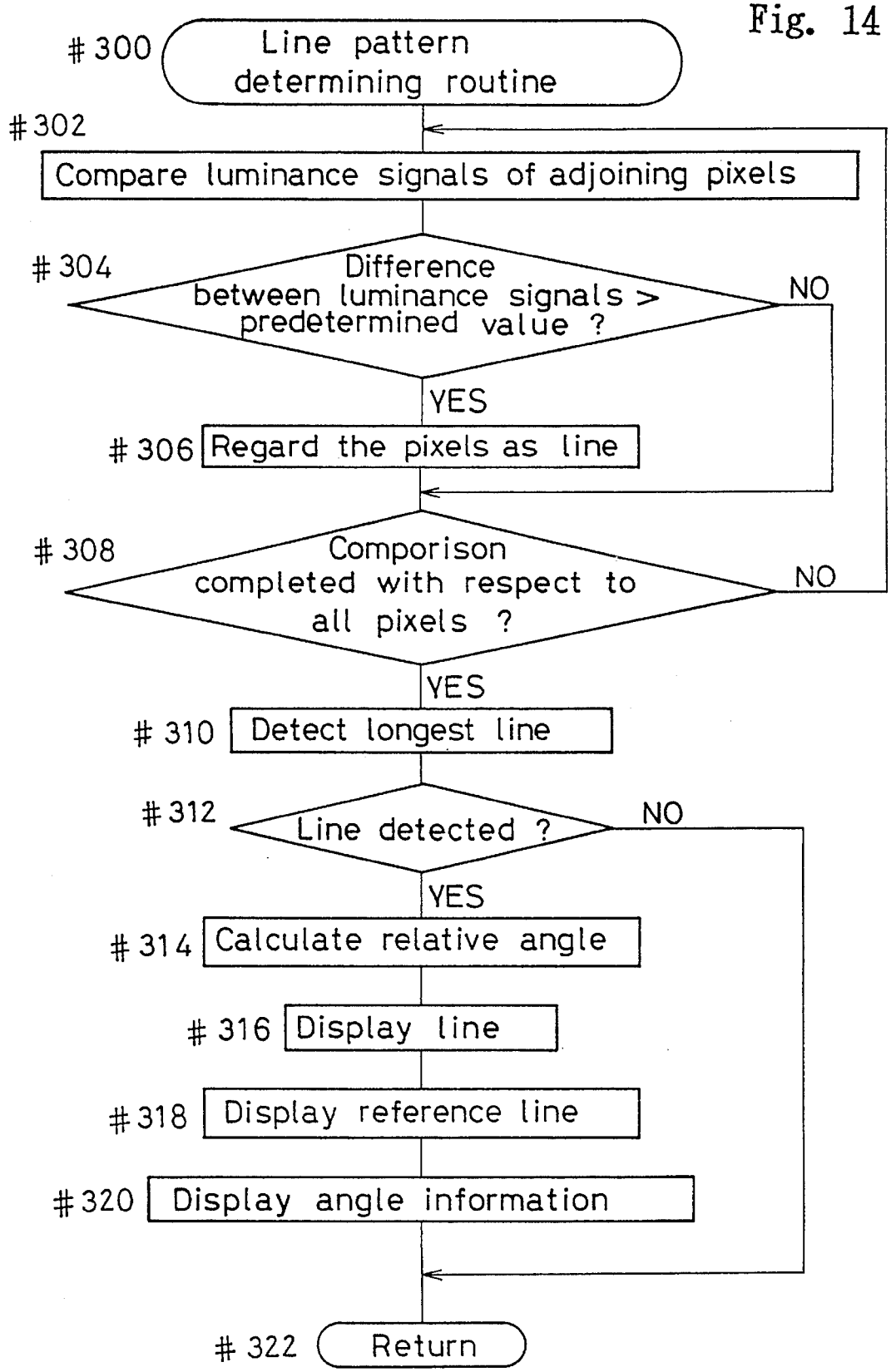
FIG. 14 is a flow chart of a line pattern determining routine.

FIG. 14 is a flow chart of the line determining routine executed at step #256 of the composition routine of FIG. 13.

Figure 15A:
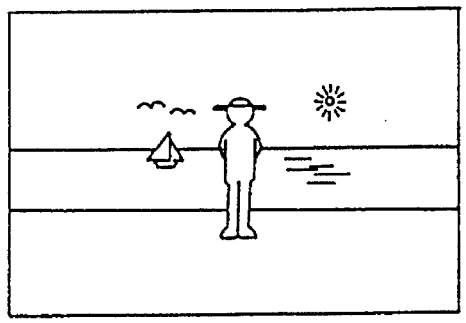
FIGS. 15A, 15B and 15C show a manner of line pattern determination.
Figure 15B:
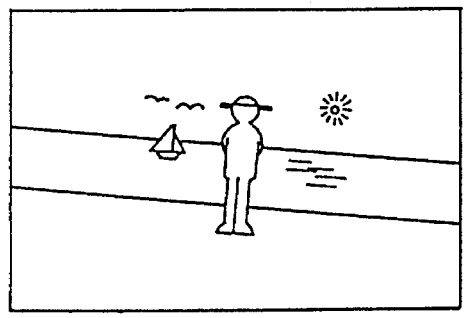
Figure 15C:
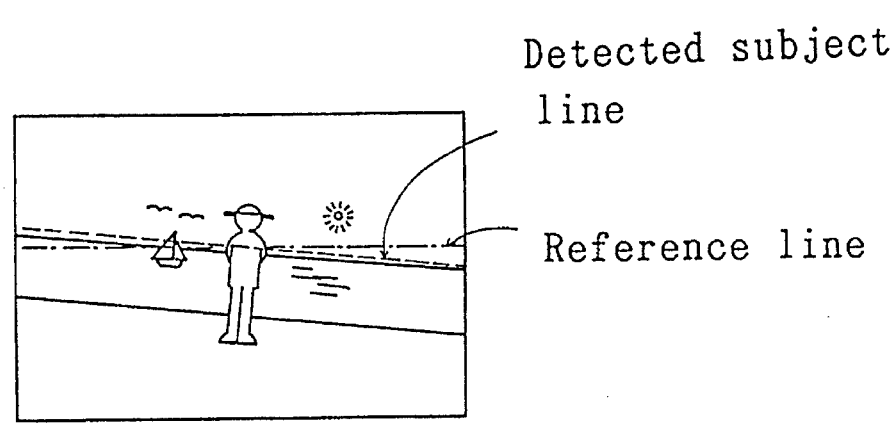

Before the flow chart is described, a line determining manner will be described with reference to EVF image planes of FIGS. 15A, 15B and 15C. FIG. 15A shows a case where the camera body is held horizontally to a subject. In this case, horizontal lines of the subject are horizontal to the EVF image plane frame. Therefore, the lines, for example, the horizon, are correctly horizontal to the film frame when the image is printed onto film. FIG. 15B shows a case where the camera body is inclined with respect to a subject for some reason. When it is not clear whether the amount of the inclination with respect to the EVF image plane frame is large or small, there is a possibility that the inclined image is printed onto film. In this case, the inclination amount is not recognized until the picture is developed. In order to recognize the inclination before actual photographing, lines are displayed within the EVF image plane. FIG. 15C shows an example thereof. The pattern of a subject is recognized to detect a horizontal line of the subject. Then, a reference line parallel to the EVF image plane frame and the detected horizontal line of the subject are simultaneously displayed at almost the same position. As a result, recognizing the inclination amount of the subject, the user can correct the inclination of the camera body. While a horizontal line is detected in this example, a vertical or oblique line may be detected. An oblique line can be used for monitoring a correlation with a horizonal or vertical line. Information on an angle with respect to a horizonal or vertical line which angle is calculated in the line detection of a subject may quantitatively be displayed within or outside the image plane.

Returning to FIG. 14, the flow will be described. To detect a horizontal or vertical or oblique line in subject image information, a portion, of the subject image information, where the space differential value of a luminance signal of the subject image information is large, that is, a portion where variation in luminance signal is large is detected. The portion is regarded as a line. At step #302, luminance signals of adjoining dots are compared. This routine is executed in a digital processing manner. Whether or not the difference between the luminance signals of the adjoining signals is larger than a predetermined value is determined at step #304. When it is larger, the pixels are regarded as a line portion of the subject at step #306. At step #308, whether or not the comparison has been completed with respect to all the pixels is determined. When the comparison is not completed, the process returns to step #302, and the comparison is repeated. When the comparison is completed with respect to all the dots at step #308, a line is formed by connecting the dots regarded as a line at step #310. Of the lines obtained, the longest one is regarded as the line portion of the subject. At step #312, whether or not the line portion of the subject has been detected is determined. When it has not been detected, the process returns at step #322. When it has been detected, a relative angle with the reference line parallel to the EVF frame is calculated at step #314. The detected line portion and the reference line are displayed at steps #316 and #318, respectively. The reference line is displayed in the vicinity of the detected line portion. At step #320, angle information is displayed. At step #322, the process returns. The line portion of the subject may be detected based on not a luminance signal but a color signal.

Figure 16:
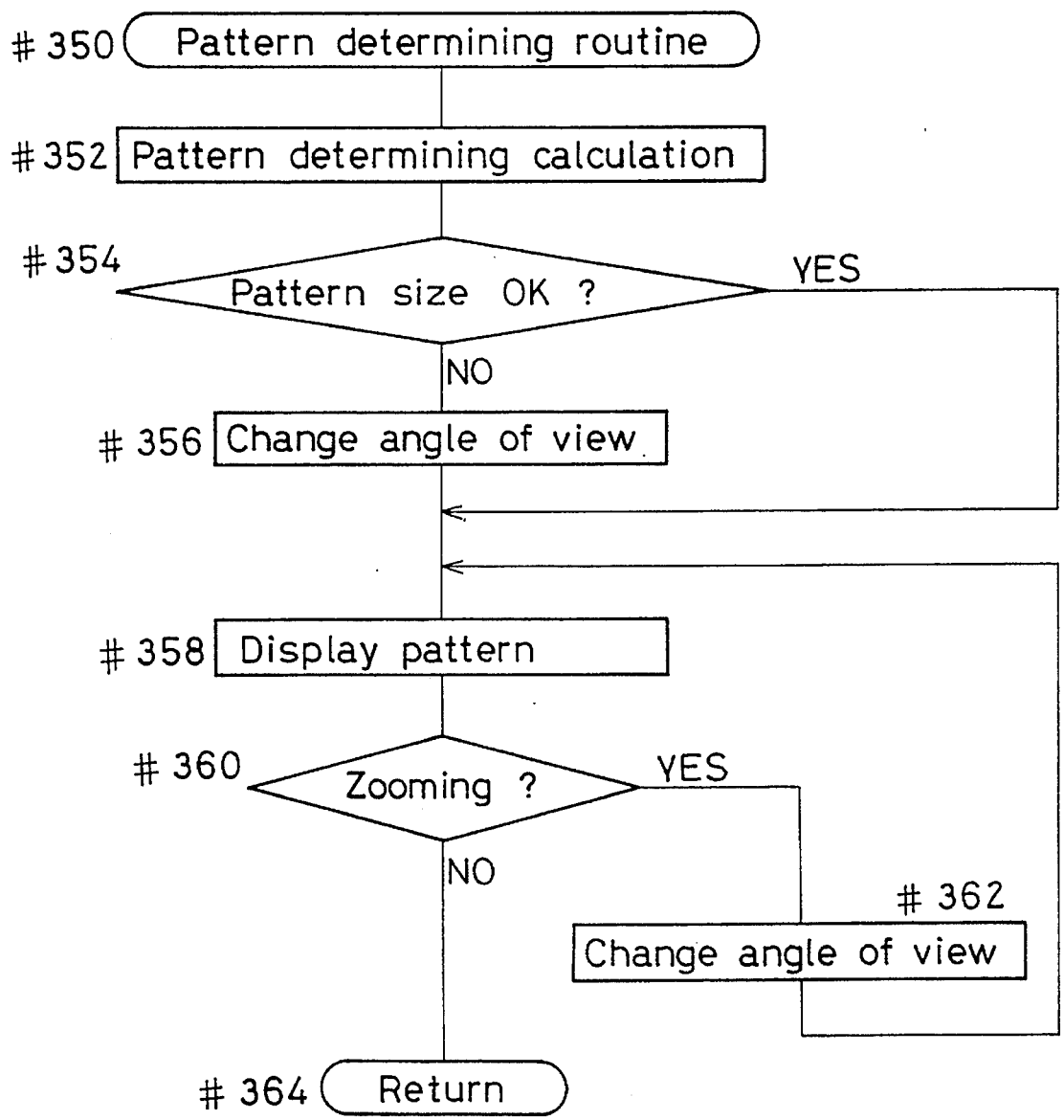
FIG. 16 is a flow chart of a pattern determining routine.

FIG. 16 is a flow chart of a pattern determining routine executed at step #260 of the composition routine of FIG. 13.

Figure 17A:
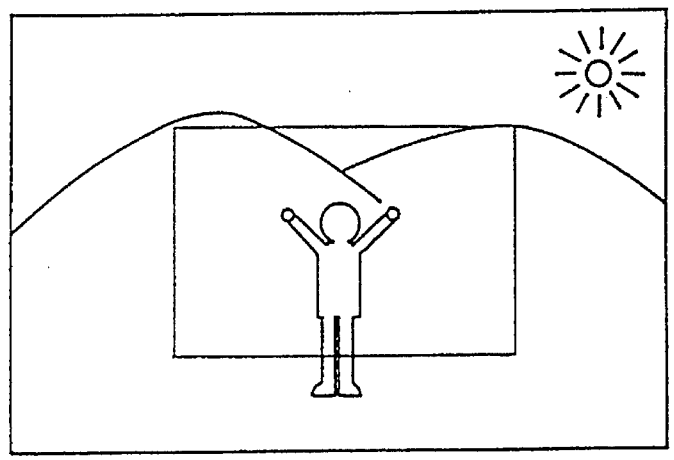
FIGS. 17A, 17B and 17C show a manner of pattern determination.
Figure 17B:
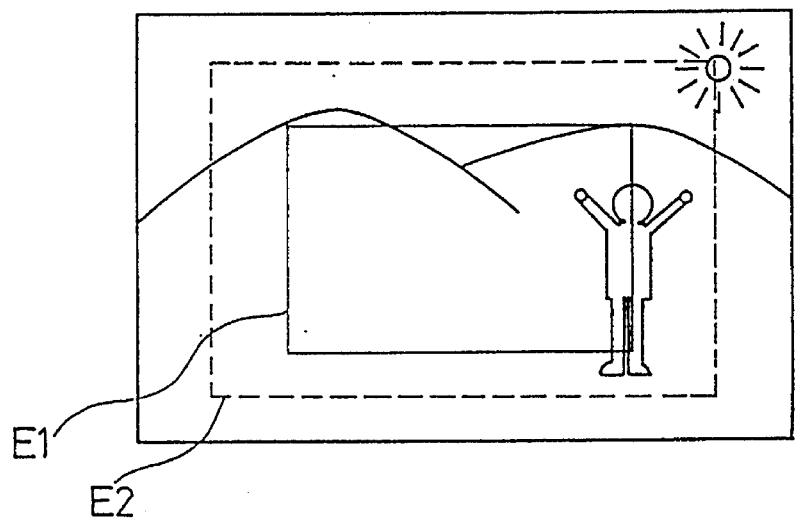
Figure 17C:
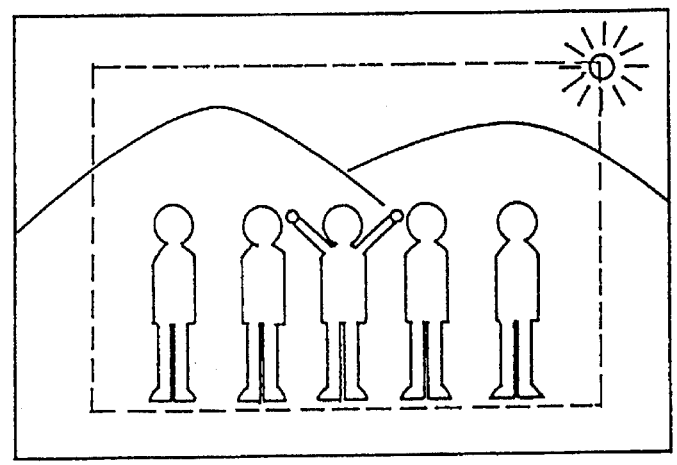

At step #352, the size and position of a pattern of an object are calculated through a pattern determining calculation to set an angle of view of a predetermined ratio including the pattern. As shown in FIGS. 17A, 17B and 17C, a subject is displayed at a set angle of view. At this time, the photographed area is also displayed. At step #354, whether or not the pattern overflows from the photographed angle of view (area frame) is determined. When it overflows, the angle of view is automatically changed at step #356. In FIG. 17B, an area E1 is changed to an area E2. The pattern is displayed at the changed angle of view at step #358. When the pattern is not satisfying, zooming is performed in accordance with the user's intention at steps #360 and #362. Then, the process returns to step #358 to provide a display again. When the new angle of view is satisfying, the process returns at step #364.

FIGS. 17A, 17B and 17C show EVF image planes where the angle of view is automatically set through the above-described pattern determination. FIG. 17A shows an angle of view where a person and background is arranged at an appropriate balance by determining the pattern of the person. FIG. 17B shows a case where the person pattern is shifted from the position of FIG. 17A toward the end of the EVF image plane. The area frame is automatically widened so that the person pattern is included in the photographed angle of view. FIG. 17C shows a case where there are a plurality of numbers of persons. The angle of view is determined so that all the persons are included. As the display method, there are two methods, one of which is a method where the area frame is displayed within the image plane as shown in FIG. 17A and the other of which is a method where only an area within the area frame is displayed in full image plane size. The two methods may selectively be changed.

Pattern determination in the case of a moving subject will be described later in a description of the moving subject determining routine. In a moving subject determining mode, it is impossible to decide an optimum angle of view when the subject is not moving since the size of the subject cannot be detected. In the above-mentioned pattern determining mode, however, it is possible to discriminate the size of the subject even if the subject is not moving. As a result, an optimum angle of view for the subject can be decided.

Various methods have conventionally been known of detecting a moving subject within the image plane. If a moving subject is detected, the size of the subject can be calculated through the pattern determination. By calculating the size of the moving subject, an optimum angle of view can be set more accurately than in the conventional program zooming where an angle of view is decided so that a subject image magnification ([focal length of the taking lens]/ [subject distance]) takes a predetermined value. That is, in the conventional method, since only a subject distance is provided as subject information, the same angle of view is set for subjects of different sizes such as an adult and a child if the subject distances are the same. If it is discriminated that a subject is moving, the size of the subject can be calculated, and by taking the size into consideration, photographing is always performed at an optimum angle of view.

The size of a moving subject is obtained by calculating the size of a pattern area which is determined to be a moving subject or which has color information the same as that of an area determined to be a moving subject. Luminance distribution within the image plane may be used instead of color distribution.

Concerning a detected moving subject, not only the size thereof but also the moving amount thereof can be calculated. If the moving amount is detected, it is possible to control exposure at an optimum shutter speed which is in accordance with the moving amount. As a result, a picture with no blur can be taken.

It is difficult to photograph a moving subject in a composition desired by the user. However, since this embodiment is provided with a means for automatically performing release when it is detected that a moving subject has moved to a specific position in the image plane, the moving subject can easily be photographed in an appropriate composition. While the predetermined position can be set to the center of the image plane, it may be set to a position desired by the user. In that case, the position is set by operating an operation member such as a dial.

Figure 18:
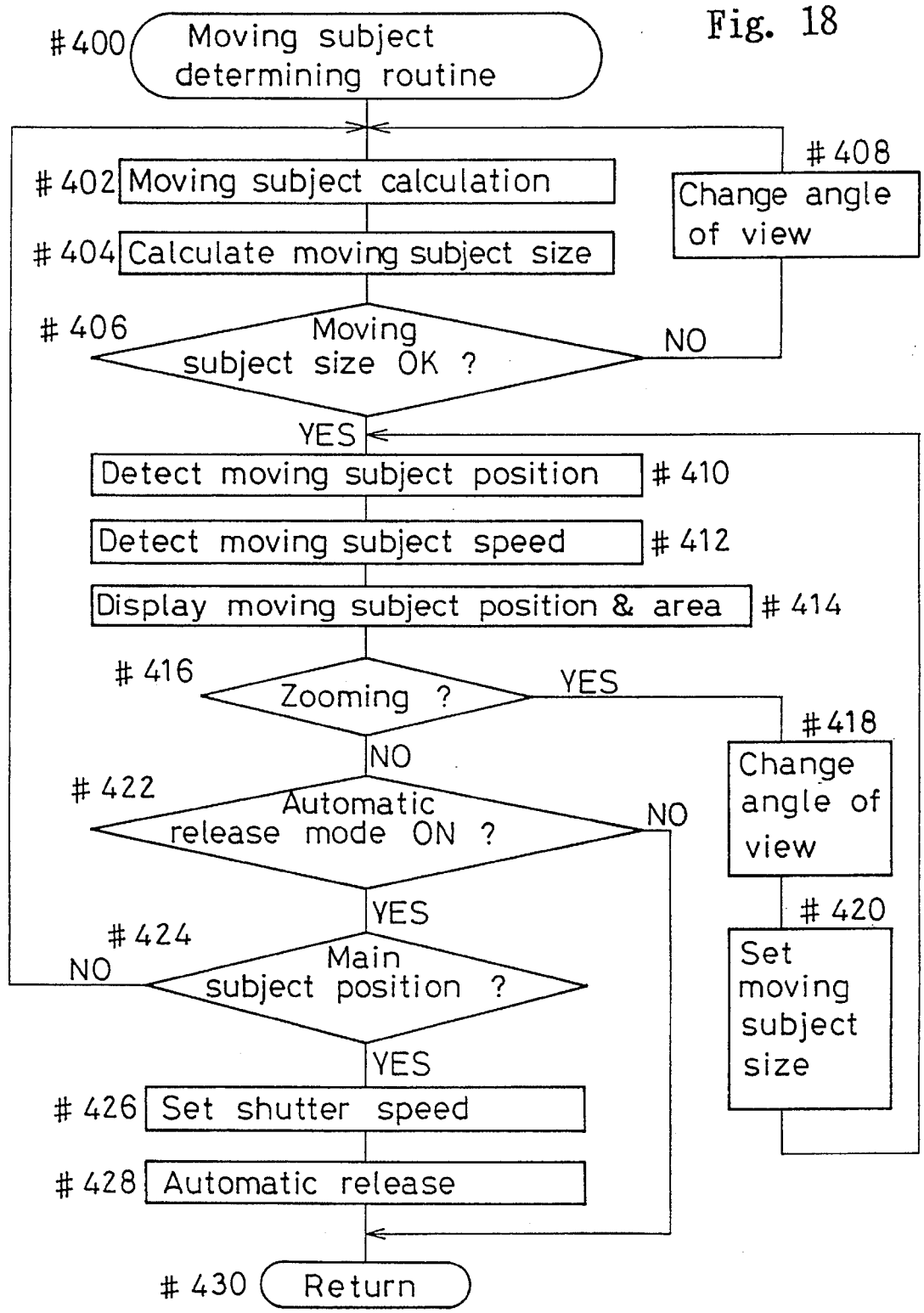
FIG. 18 is a flow chart of a moving subject determining routine.

FIG. 18 is a flow chart of the moving subject determining routine executed at step #264 of the composition routine of FIG. 13.

At step #402, a moving subject determining calculation is performed. At step #404, the size of the moving subject is calculated. At step #406, the size of the moving subject are compared with the photographed angle of view. When the photographed angle of view is appropriate, the process proceeds to step #410. Otherwise, the angle of view is changed at step #408, and the flow from step #402 is executed again. While the angle of view is normally changed by zooming of the taking lens, it may be changed through trimming photographing or pseudo focal length photographing. When the angle of view is appropriate at step #406, the position and the moving amount of the moving subject are detected at steps #410 and #412, respectively. At step #414, the position and area of the moving subject are displayed. When the automatically set angle of view is not satisfying, zooming is manually performed by the user at step #418 to change the angle of view. A moving subject position area is also changed according to the change in angle of view, and the changed area is discriminated. A change in size of the moving subject is set at step #420, and the flow from step #410 is executed again. When it is determined that zooming is unnecessary at step #416, whether an automatic release mode is ON or not is determined at step #422. When the automatic release mode is not ON, the process returns at step #430. When the automatic release mode is ON, a preset main subject position and the moving subject position are compared at step #424. When the moving subject is not situated at the preset main subject position, the process returns to step #402 to execute the flow therefrom again. When the moving subject is situated at the preset main subject position, an appropriate shutter speed is set based on the detected moving amount of the moving subject at step #426. At step #428, automatic release is performed. At step #430, the process returns.

Figure 19A:
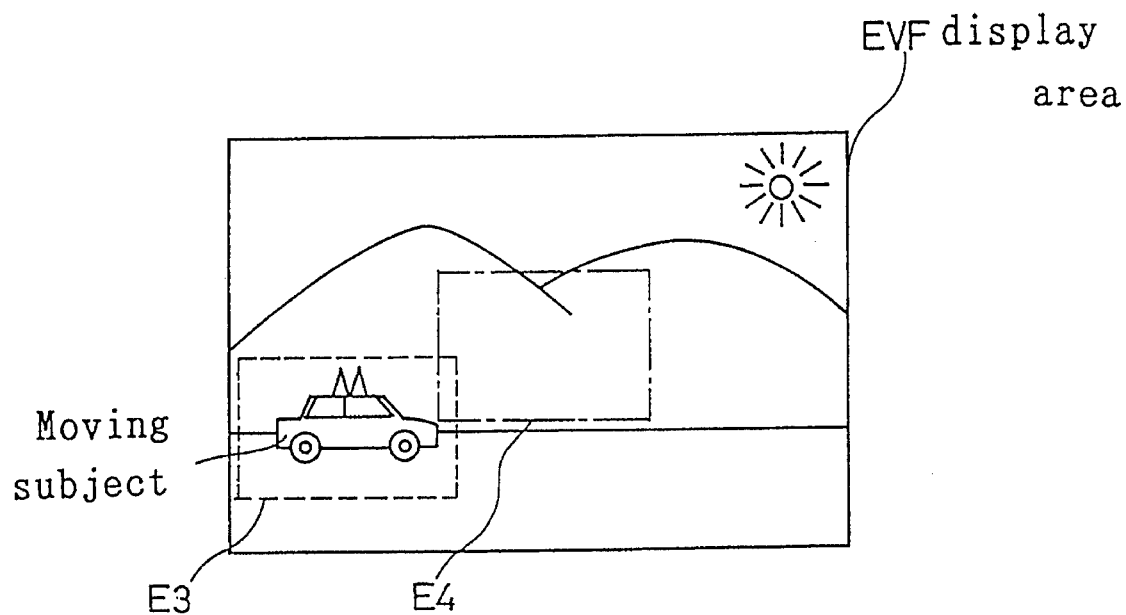
FIGS. 19A and 19B show a manner of moving subject determination.
Figure 19B:
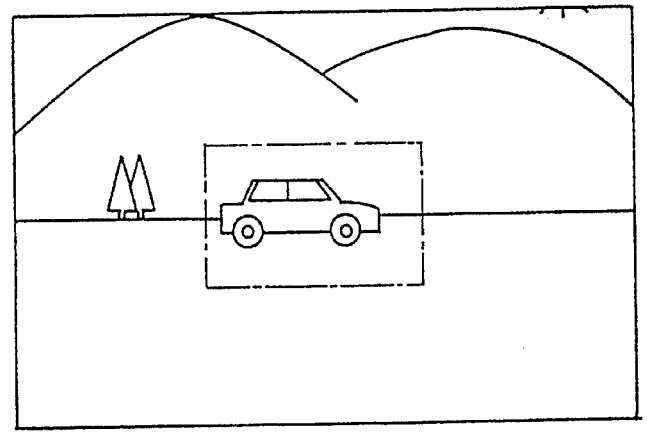

FIGS. 19A and 19B show EVF image planes in the moving subject determining mode. When the moving subject determining mode is set, a predetermined area E3 including a moving subject is displayed in the EVF image plane (step #414 of FIG. 18). The size of the area E3 is automatically decided so that the entire moving subject is included with predetermined margin. A photographed area E4 of the taking lens is simultaneously displayed in the EVF image plane. The areas E3 and E4 are of the same size. When the sizes of the areas are appropriate, release is performed when the moving subject enters the area E4. FIG. 19A shows an example of an EVF image plane viewed before the picture composition is decided. FIG. 19B shows an example of an EVF image plane viewed just before release. Release is performed by the user's decision, or is automatically performed when it is detected that the moving subject enters the area.

In case of the automatic release, firstly, a principal moving direction (that is, along the longer side or the shorter side of the image plane) of the moving subject is determined. Then, when the moving subject has moved to the center of the side along which the moving subject is moving, release is performed. At this time, framing with respect to the other direction is performed by the user. The main subject position may previously be set to a position other than the center of the side. When the moving subject area and the previously-set main subject position coincide, release is automatically performed.

FIG. 20 is a flow chart of the monitoring routine executed at step #268 of the composition routine of FIG. 13. The monitoring mode is a mode where the effects of a shutter speed Tv and an aperture value Av are monitored before exposure control to select appropriate shutter speed Tv and aperture value Av.

At step #452, an exposure value Ev is inputted. The exposure value Ev is decided based on luminance information obtained from the CCD and film information. At step #454, whether a mode where the effect of a shutter speed is monitored (hereinafter referred to as Tv mode) is ON or not is determined. When the Tv mode is ON, the flow from step #456 is executed. When the Tv mode is not ON, it being determined that a mode where the effect of an aperture value Av is monitored (hereinafter referred to as Av mode) is ON, the flow from step #462 is executed. Then, the process returns at step #468.

When the Tv mode is ON, at step #456, a shutter speed Tvp is calculated based on an optimum normal photographing program line which is in accordance with the inputted exposure value Ev. At step #458, an image controlled based on the Tvp (specifically, based on an accumulation time of the CCD) is read. At step #460, photographing information on images of $\alpha$ ($\alpha$=1,2,3, . . . n) frames before and after the images controlled based on the Tvp is read. While information on images one frame before and after the image based on Tvp is read in this embodiment, any number of frames may be read for comparison with the Tvp image if the number is two or more.

The Av mode is a mode for simulating a depth of field, a focus range and the effect of blur in the background. At step #462, an aperture value Avp is calculated based on a normal photographing optimum program line which is in accordance with the inputted exposure value Ev. At step #464, the aperture of the finder is closed based on the Avp to read image data of the CCD. At step #466, photographing information on images of $\alpha$ frames before and after an image based on the Avp is read. Similarly to the case of Tvp, any number of frames may be read if the number is two or more.

For the reading of Tvp$\pm\alpha$ and Avp$\pm\alpha$ information, a method is used where an image is read by actually changing the CCD accumulation time or the aperture value.

Figure 21:
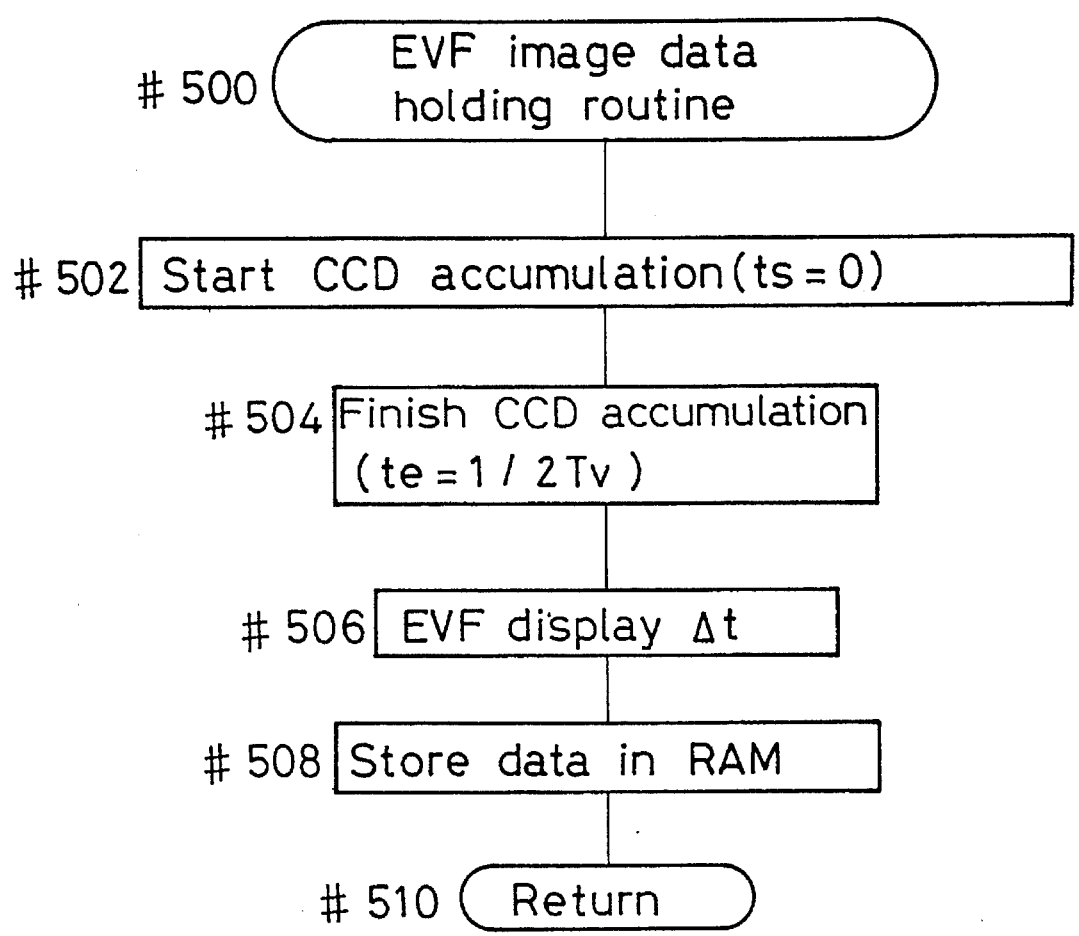
FIG. 21 is a flow chart of an EVF image data holding routine.

FIG. 21 is a flow chart of the EVF image data holding routine executed at step #116 of FIG. 10. This is a routine for holding an image data to display it after release.

This routine is started when the release switch is turned on to activate the shutter to start exposure at step #114 of FIG. 10. At step #502, CCD accumulation is started. At step #504, the CCD accumulation is finished. The period of time from the start to the end of the CCD accumulation is ½Tv when the control shutter speed value is Tv. Since the taking lens and the EVF optical system are separately provided, an appropriate exposure amount to film is different from that to the CCD. For this reason, the EVF optical system is provided with an aperture mechanism so that the exposure amount to the CCD is optimal. At step #506, after the exposure to film is completed, image information obtained through the CCD during the exposure is displayed in the EVF. A display time $\Delta t$ is approximately 1 to 10 seconds. At step #508, the obtained image information is stored in a data storing RAM (random access memory) as a photographing record data.

While the above description is on a compact camera and an EVF provided therein, an embodiment will hereinafter be described where the present invention is employed for a single-lens reflex camera (hereinafter referred to as SLR camera). In this embodiment, the EVF image plane is divided to enable simulation under various conditions.

Figure 22:
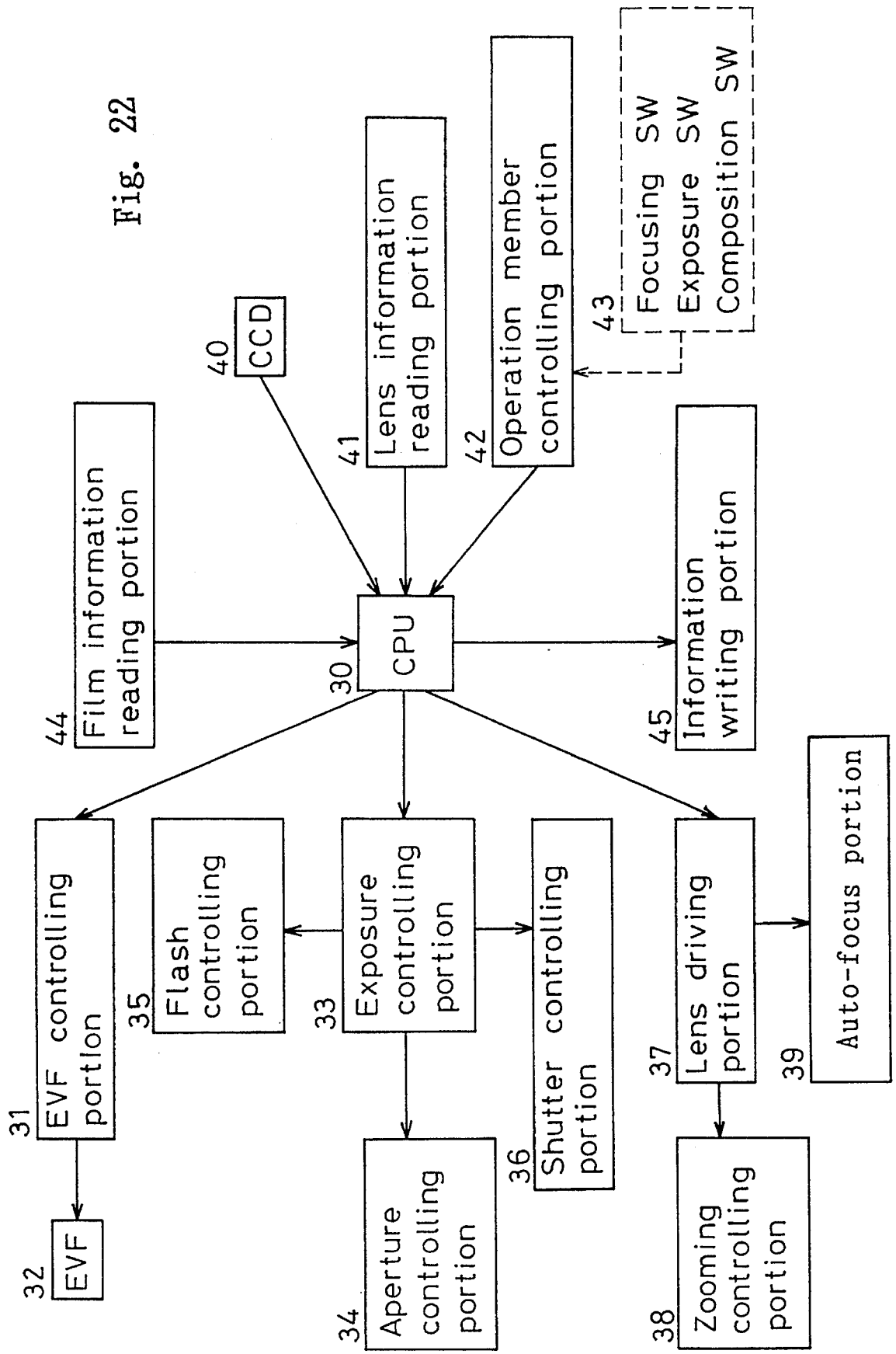
FIG. 22 is a block diagram of a single-lens reflex camera provided with an electronic viewfinder.

FIG. 22 is a block diagram of an SLR camera provided with an EVF. The following are connected to a CPU (central processing unit) 30 for controlling each controlling portion: an EVF controlling portion 31; an exposure controlling portion 33; a lens driving portion 37; a CCD 40; a lens information reading portion 41; an operation member controlling portion 42; a film information reading portion 44; and an information writing portion 45 for writing information to film.

The EVF controlling portion 31 drives and controls an EVF 32 made of liquid crystal devices.

The exposure controlling portion 33 controls the exposure amount to film through an aperture controlling portion 34 for driving the aperture of the lens, a flash controlling portion 35 for controlling an auxiliary light source such as a flash and a shutter controlling portion 36 for controlling the shutter which adjusts a period of time of field light irradiation to film.

The lens driving portion 37 varies the photographed angle of view and moves the lens to an in-focus position through a zooming controlling portion 38 for performing zooming and an auto focus portion 39 including a focus detecting portion and a focusing driving portion.

The CCD 40 senses field light. It may be an image sensing device other than CCD.

The lens information reading portion 41 reads taking lens information such as an F number.

The operation member controlling portion 42 controls switches 43 including a focusing switch for inputting in-focus position data, an exposure switch for inputting an exposure amount, a shutter speed and an aperture value and a composition switch for inputting a photographed angle of view.

The film information reading portion 44 reads ISO sensitivity and latitude codes from a film cartridge.

The film information writing portion 45 writes photographing information to film.

Figure 23:
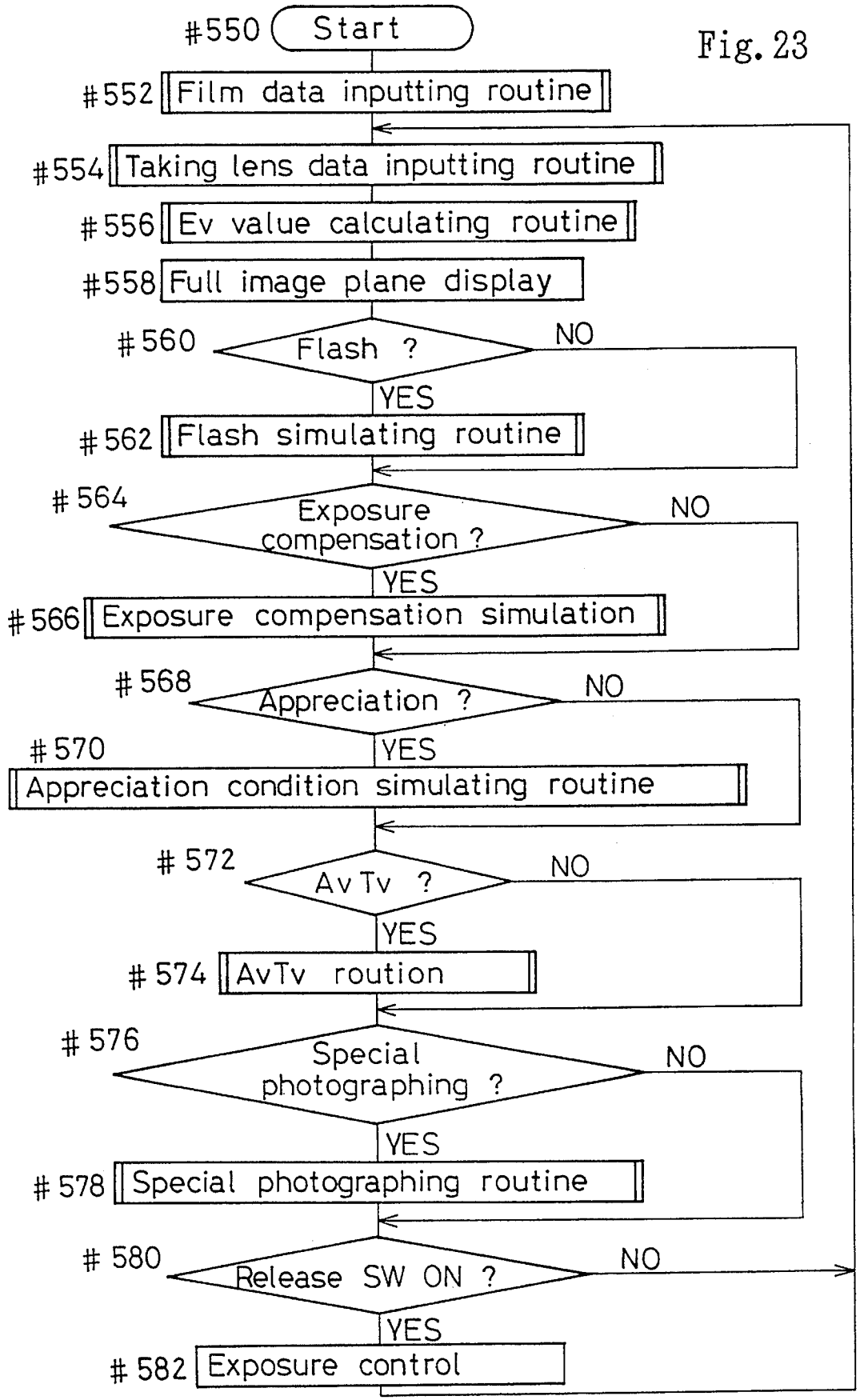
FIG. 23 is a flow chart of a main routine of control of the single-lens reflex camera.

FIG. 23 is a flow chart of a main routine which is started when the power is turned on and is ended when exposure control is completed.

The process is started when the power is turned on (step #550). A film data and a taking lens data are inputted to the camera at steps #552 and #554, respectively. Description of the film data inputting routine and that of the taking lens data inputting routine will be omitted since they are the same as those of FIGS. 11 and 12. At step #556, an Ev calculating routine is executed where an exposure value Ev to be used in an exposure control is calculated based on distance information, luminance information and color information of the field obtained by the CCD 40. At step #558, image information obtained by the CCD 40 is displayed in the EVF 32 in full image size based on the calculated exposure value Ev.

At step #560, whether it is determined that the flash is necessary based on the calculated exposure value Ev or the user has requested use of the flash is determined. When the flash is used for either reason, at step #562, a flash simulating routine is executed where the user evaluates a flash effect. In this routine, flash light pre-emission is performed, and a flash effect is evaluated based on image information obtained by the CCD 40 at the pre-emission.

At step #564, whether exposure compensation is necessary or not is determined. When it is necessary, an exposure compensation simulating routine is executed at step #566. In this routine, the effect of exposure compensation is evaluated based on image information obtained by the CCD 40 based on the compensated exposure value.

At step #570, an appreciation condition simulating routine is executed where image information processed by the CPU 30 in accordance with characteristics of the recording medium. At step #572, an Av Tv routine where the difference between pictures depending on the shutter speed and the aperture value is evaluated based on image information obtained by actually varying the shutter speed and the aperture value. At step #578, a special photographing routine is executed where a special photographing performed between exposure is evaluated based on image information obtained by moving the lens during a pre-emission. Description of the Av Tv routine will be omitted since it is the same as the monitoring routine of FIG. 20.

At step #580, whether the release switch is ON or not is determined. When it is ON, exposure control is performed in a well-known manner at step #582. Then, the process returns to step #554 to repeat the flow therefrom. When the release switch is not ON, the process directly returns to step #554 to repeat the flow therefrom.

Figure 24:
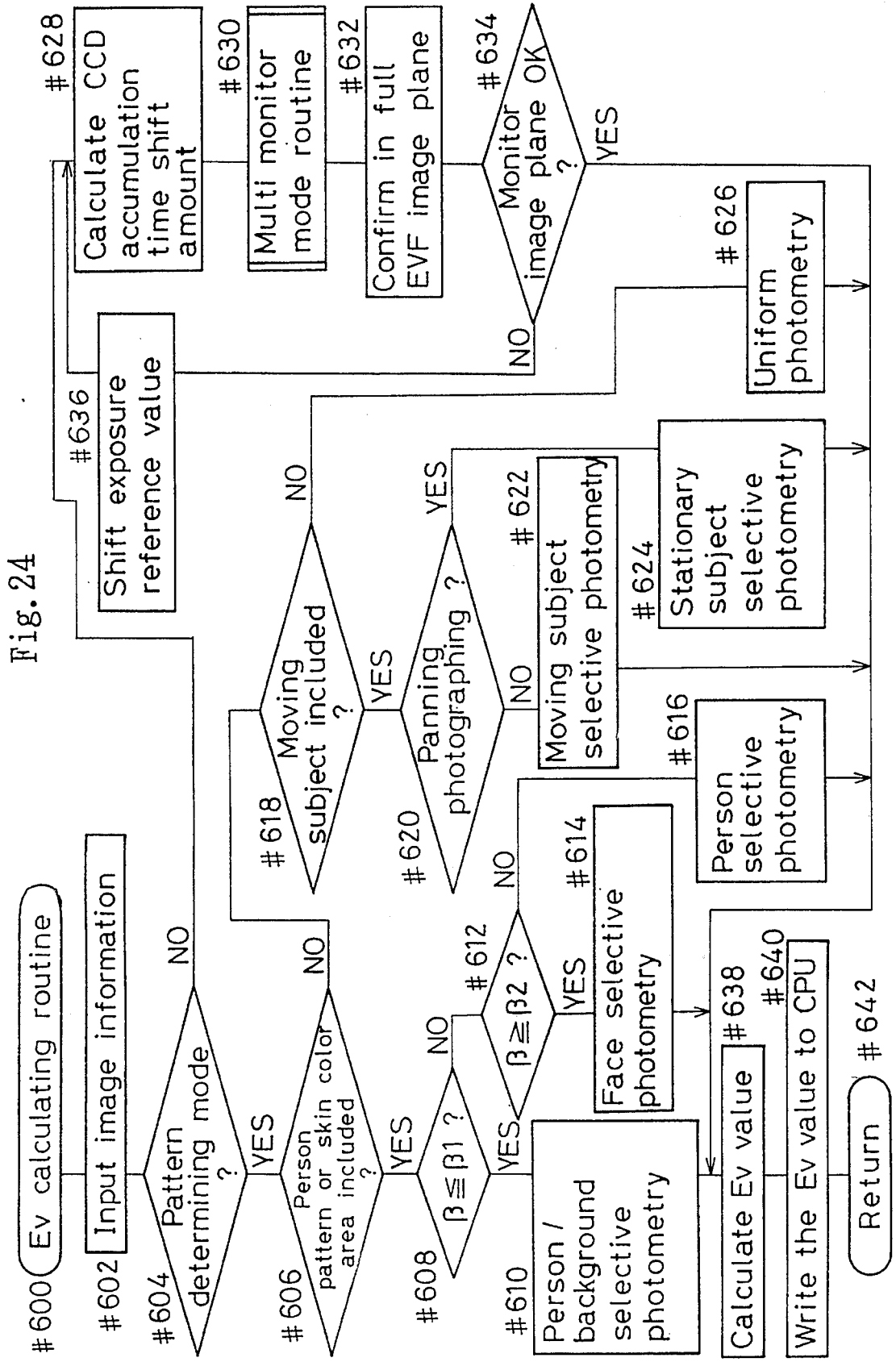
FIG. 24 is a flow chart of an Ev calculating routine.

FIG. 24 is a flow chart of the Ev calculating routine executed at step #556 of FIG. 23.

At step #602, image information is inputted from the CCD 40. At step #604, whether the pattern determining mode has been selected or not is determined.

When the pattern determining mode has been selected, whether or not the image information includes a person pattern or a skin color area is determined at step #606. When a person pattern or a skin color area is included, whether or not a magnification $\beta$ ([focal length of the taking lens]/[subject distance]) is equal to or smaller than a predetermined value $\beta1$ is determined at step #608. This is for determining whether the user intends to take a portrait or not. When the magnification $\beta$ is equal to or smaller than the predetermined value $\beta1$, it being determined that the user does not intend to take a portrait, a person/background selective photometry where the same weight is given to a person and the background is performed at step #610. When the magnification $\beta$ is larger than $\beta1$ at step #608, that is, when the user intends to take a portrait, whether or not the magnification $\beta$ is equal to or larger than a predetermined value $\beta2$ ($\beta1<\beta2$) is determined at step #612. This is for determining whether the face of a person is clearly discriminated or not. When the magnification $\beta$ is larger than the predetermined value $\beta2$, a face selective photometry where weight is given to the face of the person is performed at step #614. The face selective photometry is for photographing a half-length picture or a close-up of the face. When the magnification $\beta$ is smaller than the predetermined value $\beta2$ at step #612, a person selective photometry where weight is given to the whole body of a person is performed at step #616. The person selective photometry is for photographing a full-length or a half-length picture of a person.

When neither person pattern nor skin color area are included at step #606, whether the image information includes a moving subject or not is determined at step #618. When a moving subject is included, whether the user is performing panning photographing or not is determined at step #620. When the user is not performing panning photographing, a moving subject selective photometry where weight is given to a moving subject is performed at step #622. When the user is performing panning photographing, since a stationary subject is relatively regarded as a moving subject, a stationary subject selective photometry where weight is given to a stationary subject is performed at step #624. When no moving subject is included at step #618, a uniform photometry is performed at step #626.

When the pattern determining mode has not been selected at step #604, a highlight/shadow mode is set, and the flow from step #628 is executed. While the selection between highlight and shadow is made by the user, the luminance of a highlight or a shadow portion is decided by the camera. That is, at step #628, a shutter speed, specifically, an accumulation time shift amount of the CCD 40 in photometry at highlight or shadow is calculated. At step #630, some exposure amounts are evaluated in a subsequently-described multi monitor mode routine to select one of them. At step

632, an image based on the selected exposure amount is monitored in the full EVF image plane. At step #634, whether the selected image is satisfying or not is determined. When it is satisfying, the process proceeds to step #638. When it is not satisfying, the exposure reference value is shifted at step #638. Then, the process returns to step #628 to make the evaluation again. The evaluation may be made based on variation in aperture value instead of variation in accumulation time (shutter speed) of the CCD 40.

After each of the above-mentioned photometries is finished, the process proceeds to step #638, where the exposure value Ev is calculated. At step #640, the calculated exposure value Ev is written to the CPU 30 of the camera. Then, at step #642, the process returns to the main routine.

Figure 25:
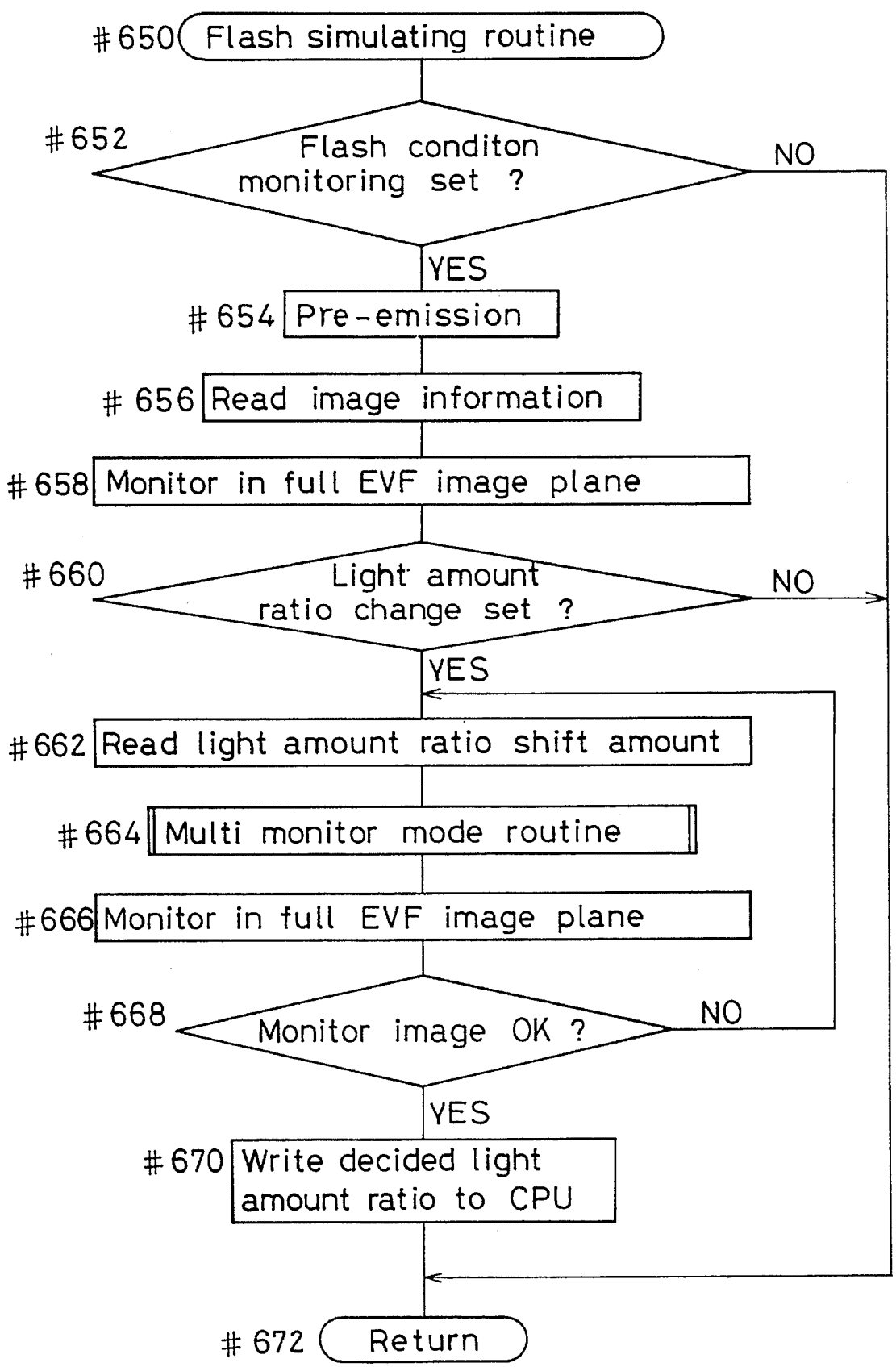
FIG. 25 is a flow chart of a flash simulating routine.

FIG. 25 is a flow chart of the flash simulating routine executed at step #562 of FIG. 23.

At step #652, whether or not the user has set the camera so that a field condition at the time of flash emission is monitored is determined. When the setting has been made, the flash controlling portion 35 performs pre-emission at step #654. At step #656, the CCD 40 reads image information to detect the difference between the luminance of the field before the pre-emission and the luminance of the field after the pre-emission, and transmits to the CPU 30 image information obtained at that time. The CPU 30 estimates and calculates a photographing condition at the time of actual flash emission based on a luminance change accompanying the flash pre-emission to the field, and transmits the image information to the EVF 32. The image information is displayed in full image plane size at step #658. When the setting has not been made at step #652, the process returns to the main routine at step #672.

At step #660, whether or not the user has set the camera so that the ratio between a flash light amount and an ambient light amount is changed is determined. When the setting has been made, the light amount ratio shift amount set by the user is read at step #662. At this time, a flash light addition condition in each area of the field is calculated based on the luminance change detected at step #656. Flash light does not reach a distant subject although it reaches a close subject. Therefore, if the flash light amount is increased, it occurs that the brightness of the close subject increases but the brightness of the distant subject does not change. When the light amount ratio is shifted to make the flash light amount larger or smaller than a predetermined value, change in the flash light addition condition which change is caused by the increase or decrease of flash light in each area is calculated, and image information thereon is transmitted to the EVF. At step #664, some light amount ratios are evaluated in the multi monitor mode routine to select one of them. At step #666, an image based on the light amount ratio selected at step #664 is monitored in the full EVF image plane. At step #668, whether the selected image is satisfying or not is determined. When it is satisfying, the light amount ratio is written to the CPU 30 at step #670. When it is not satisfying, the process returns to step #662 to make the evaluation again with a different shift amount. When the light amount ratio is decided or when the user has not made the setting at step #660, the process returns to the main routine at step #672.

Figure 26:
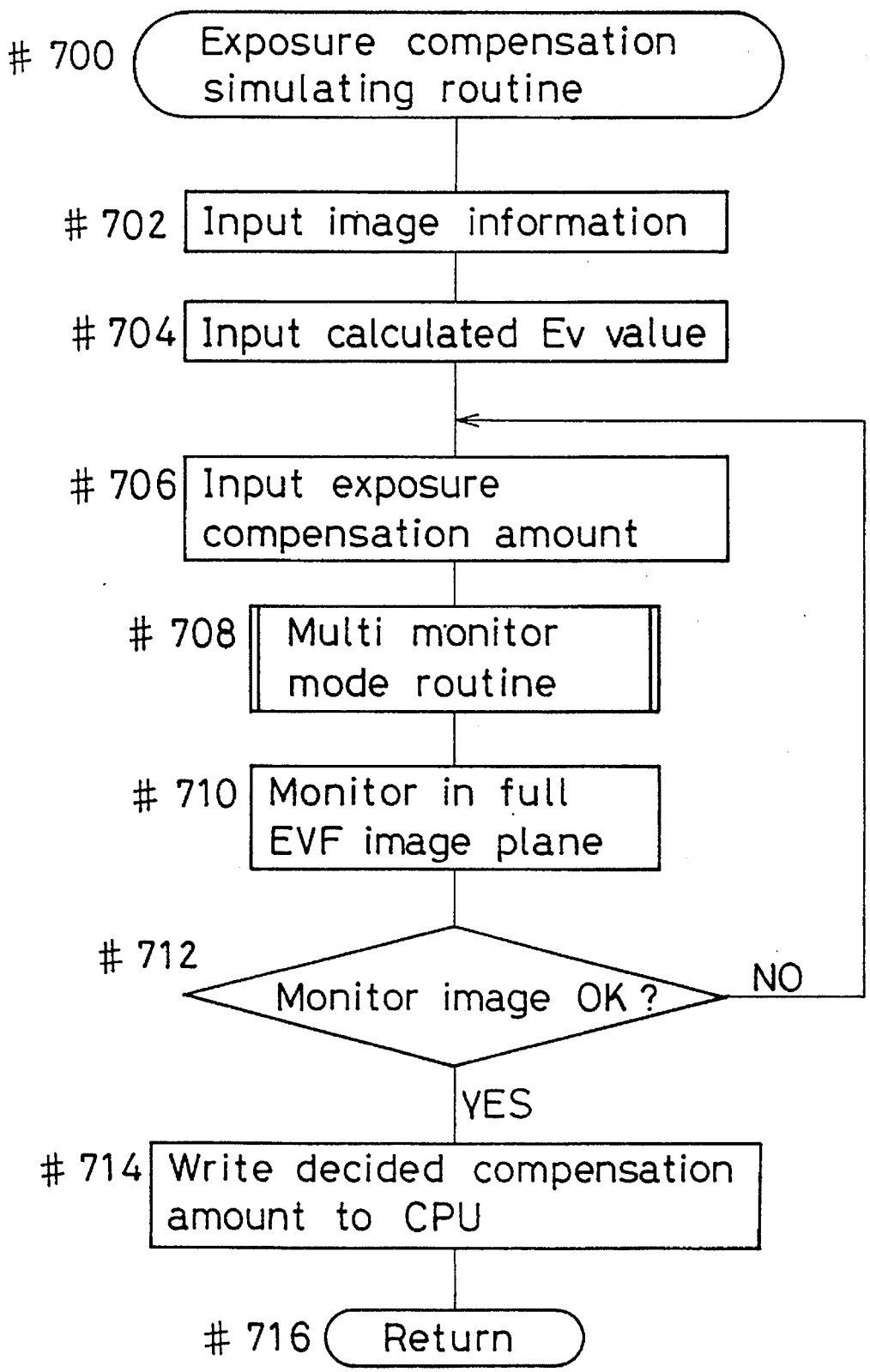
FIG. 26 is a flow chart of an exposure compensation simulating routine.

FIG. 26 is a flow chart of the exposure compensation simulating routine executed at step #566 of FIG. 23.

At step #702, image information is inputted from the CCD 40. At step #704, the exposure value Ev calculated in the Ev calculating routine of FIG. 24 is inputted.

At step #706, an exposure compensation amount inputted by the user is read. At step #708, some exposure compensation amounts are evaluated in the multi monitor mode routine to select one of them. At step #710, an image based on the exposure compensation amount selected at step #708 is monitored in the EVF full image plane. At step #712, whether the selected image is satisfying or not is determined. When it is satisfying, the exposure compensation amount is written to the CPU 30 at step #714. Then, at step #716, the process returns to the main routine. When the image is not satisfying, the process returns to step #706 to make the evaluation again with a different shift amount.

The exposure compensation amount is shifted by changing an accumulation time of the CCD 40 in actual photographing.

Figure 27:
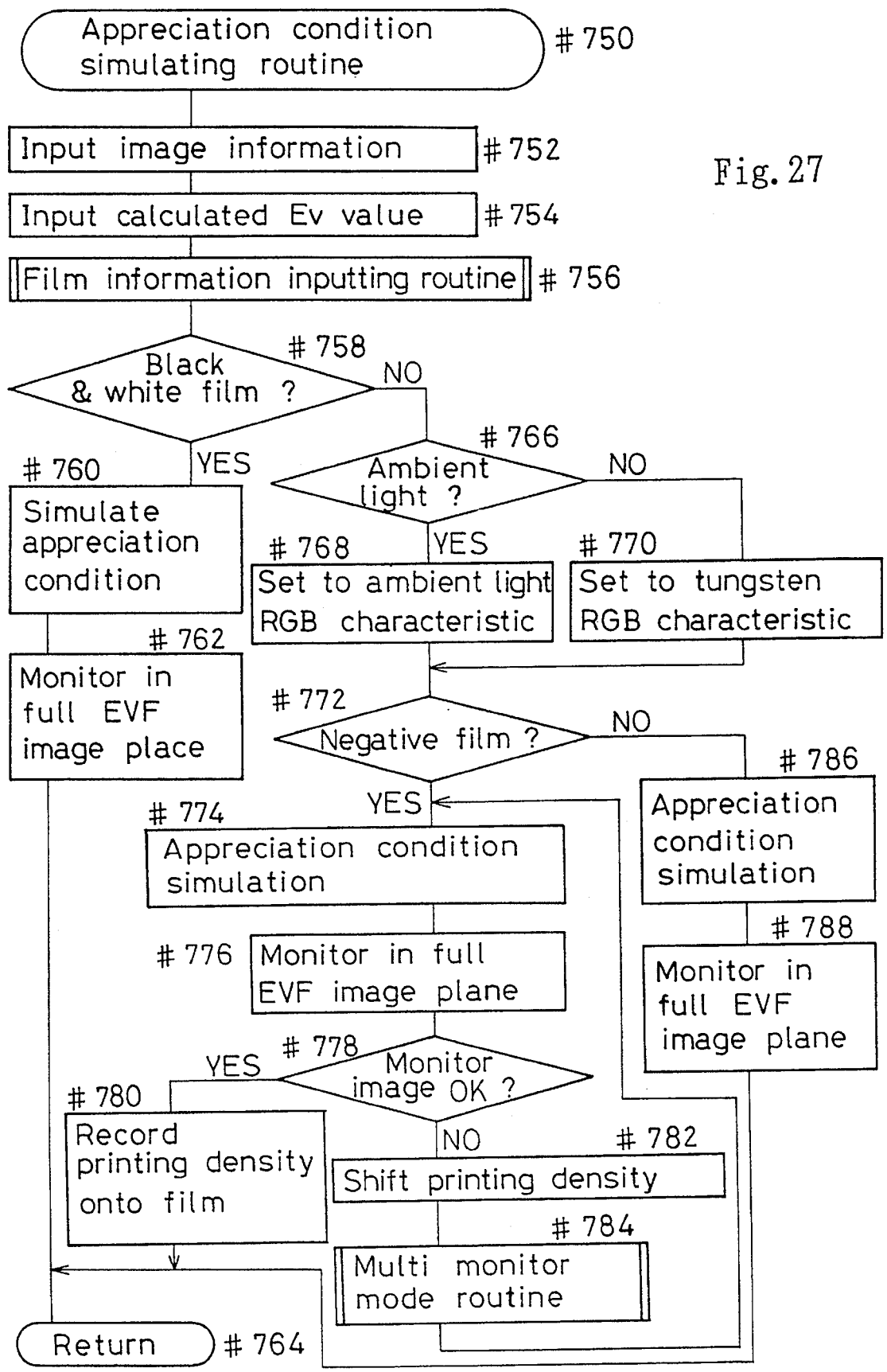
FIG. 27 is a flow chart of an appreciation condition simulating routine.

FIG. 27 is a flow chart of the appreciation condition simulating routine executed at step #570 of FIG. 23.

At step #752, image information is inputted from the CCD 40. At step #754, the exposure value Ev calculated in the Ev calculating routine of FIG. 24 is inputted. At step #756, the film data inputting routine (FIG. 11) is executed to input film information.

At step #758, whether the film is black and white film or not is determined based on the film information inputted at step #756. When the film is black and white film, the EVF 32 is set to a black and white monitor condition at step #760 (normally, the EVF 32 is in a color monitor condition), and the appreciation condition is simulated. At step #762, an image is displayed in black and white in the full image plane. At step #764, the process returns to the main routine.

When the film is not black and white film at step #758, whether the light source is ambient light or not is determined at step #766. When it is ambient light, the image plane of the EVF 32 is set to an ambient light RGB (red, green, blue) characteristic at step #768. When it is not ambient light, since the light source is a tungsten lamp, the image plane of the EVF 32 is set to a tungsten RGB characteristic at step #770.

At step #772, whether the film is negative film or not is determined. When it is negative film, the EVF 32 is set to a negative film color monitor condition at step #774, and the appreciation condition is simulated. If it is sensed based on ISO sensitivity that the film is high-sensitivity film at this time, the EVF 32 is set to a rough reproduction mode. At step #776, the image is displayed in the full image plane. At step #778, the user determines whether the image is satisfying or not. When the image is satisfying, the printing density information of the image is recorded onto the film at step #780. Then, at step #764, the process returns to the main routine. When the image is not satisfying, the printing density is shifted toward an over side or an under side at step #782. At step #784, some printing densities are evaluated in the multi monitor mode routine to select one of them. Then, the flow from step #774 is executed.

When the film is not negative film at step #772, it being determined that the film is reversal film, the EVF 32 is set to a very fine reproduction mode at step #786, and the appreciation condition is simulated. After displaying an image in the full image plane at step #788, the process returns to the main routine at step #764.

While the reproduction mode of the EVF 32 is changed over among a normal mode (black and white/color), the rough reproduction mode and the very fine reproduction mode according to the film type in this routine, it may be changed over between the very fine reproduction mode and a mode including the functions of the normal mode and the very fine reproduction mode.

Figure 28:
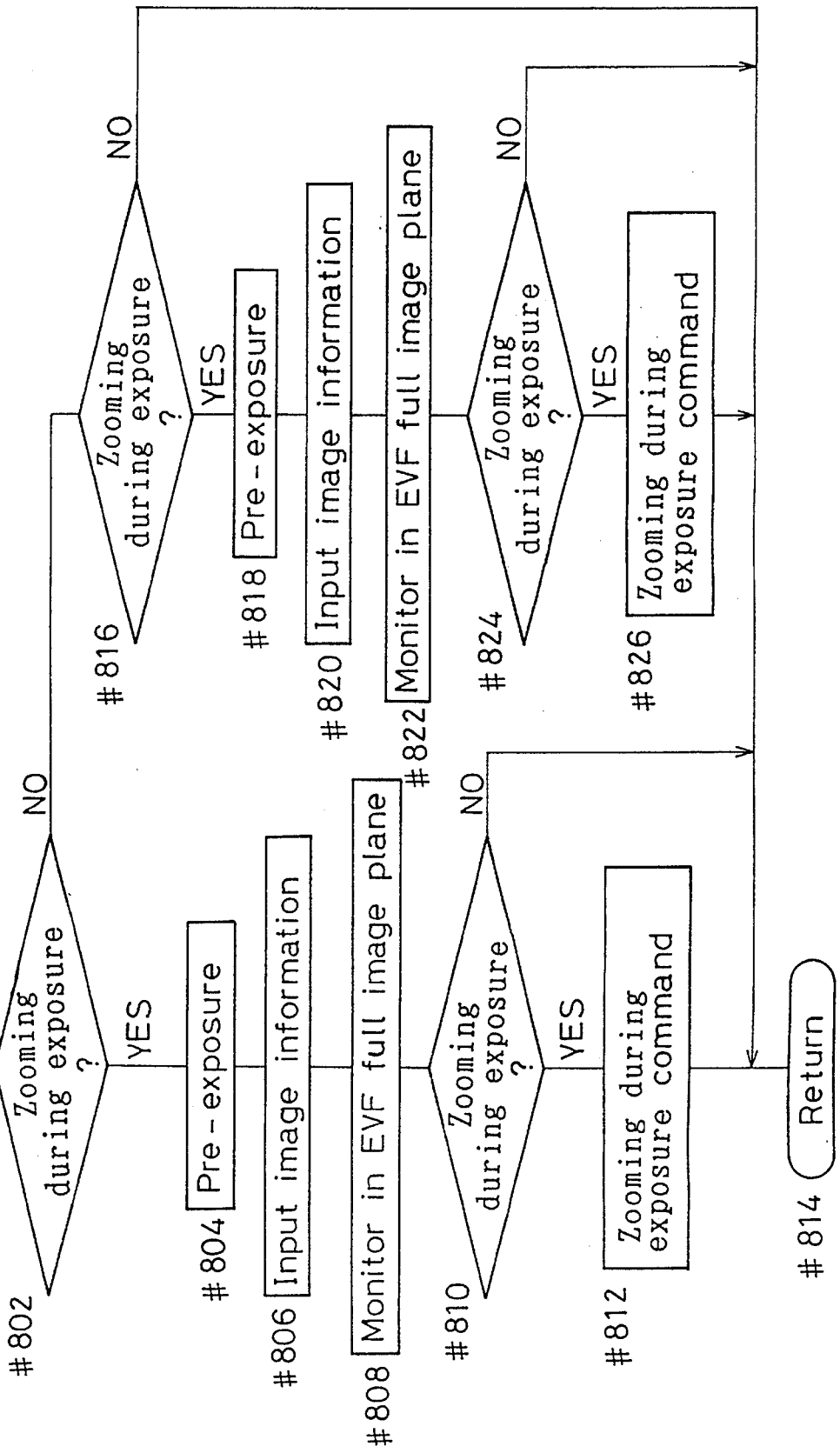
FIG. 28 is a flow chart of a special photographing routine.

FIG. 28 is a flow chart of the special photographing routine executed at step #578 of FIG. 23.

At step #802, whether or not the user has set the camera by operating the mode setting button so that zooming during exposure is performed is determined. When the setting has been made, the flow from step #804 is executed. When the setting has not been made, whether or not the user has set the camera by operating the mode button so that focusing during exposure is performed is determined at step #816. When the setting has been made, the flow from step #818 is executed. When none of the zooming and the focusing during exposure has been set, the process returns to the main routine at step #814.

When the zooming during exposure has been set, the lens is moved during pre-exposure at step #804. Then, at step #806, image information obtained at the time of the pre-exposure is inputted, and at step #808, an image based on the image information is displayed in the full image plane in the EVF 32. At step #810, checking the image displayed in the EVF 32, the user inputs whether to perform the zooming during exposure in actual photographing or not. When the user intends to perform the zooming during exposure, a zooming command is provided to the lens driving portion 37 at step #812. When the user does not intend to perform the zooming during exposure, the process directly returns to the main routine at step #814.

When the focusing during exposure has been set, the focus position is shifted during the pre-exposure at step #818. At step #820, image information obtained during the pre-exposure is inputted. At step #822, an image based on the image information is displayed in the full image plane in the EVF 32. At step #824, checking the image displayed in the EVF 32, the user inputs whether to perform the focusing during exposure in actual photographing or not. When the user intends to perform the focusing during exposure, a focusing command is provided to the lens driving portion 37 at step #826. When the user does not intend to perform the focusing during exposure, the process returns to the main routine at step #814.

Figure 29:
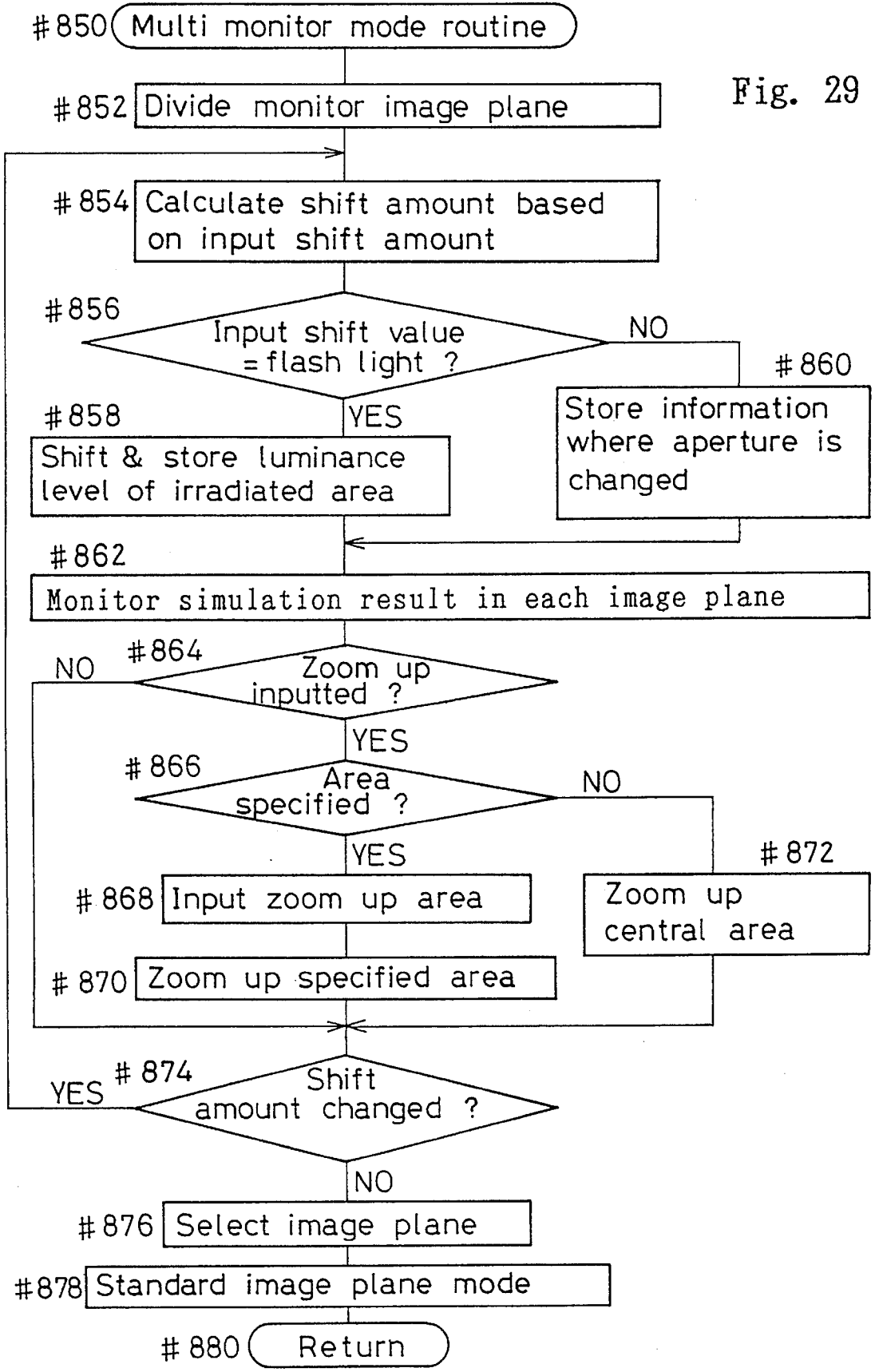
FIG. 29 is a flow chart of a multi monitor mode routine.

FIG. 29 is a flow chart of the multi monitor mode called from some of the above-described routines. The flash light amount ratio, the exposure compensation value and the printing density can be shifted in this routine.

At step #852, the EVF controlling portion 31 divides the image plane of the EVF 32 into a plurality of numbers of image planes. At step #854, an initial control value is shifted by a shift amount inputted by the user. At step #856, whether or not the inputted value represents a light amount ratio at the time of flash emission. When it represents the light amount ratio, the luminance level, in the EVF 32, of an area where flash light is irradiated during the pre-emission is shifted and stored in the CPU 30 at step #858. When the input value is not the flash light amount ratio, since it is a printing density or an exposure compensation value, information where the aperture value is changed is stored in the CPU 30. While the aperture value is changed in this routine, the shutter speed may be changed instead of the aperture value. The information stored at step #858 or #860 is displayed in each divisional image plane of the EVF 32 divided at step #850 (step #862).

At step #864, whether or not a request for zoom up of a given area of the divisional areas has been inputted is determined. When it has not been inputted, the process proceeds to step #874. When it has been inputted, whether or not the user intends to specify an area for the zooming up is determined at step #866. When the user intends to specify an area, an area is specified at step #868. At step #870, the specified area is zoomed up. When the user intend to specify no area, a central area (for example, a divisional area which occupies approximately ¼ of the divided image plane) is automatically zoomed up at step #872. To specify an area in step #868, both ends of one of the diagonals of an area to be enlarged in the divided image plane are specified by a cursor provided on the image plane. The cursor is moved by an operation member, such as a dial, provided to the camera or by line of sight sensing.

At step #874, whether or not the user has inputted a new shift amount in order to change the shift amount again since no image planes satisfy the user as a result of the user's evaluation of the effect of each image plane is determined. When the user has inputted a new shift amount, the process returns to step #854 to execute the flow therefrom again. When any of the image plane satisfies the user, the image plane is selected at step #876. The selection is made by a dial or line of sight sensing similarly to step #868. The control value of the selected image plane is set as a decided control value. When a plurality of images are selected at step #876, the average of the control values of the selected images is set as a decided control value. At step #878, the EVF 32 is shifted from the divided image plane mode to the standard image plane mode. At step #880, the process returns.

Figure 30:
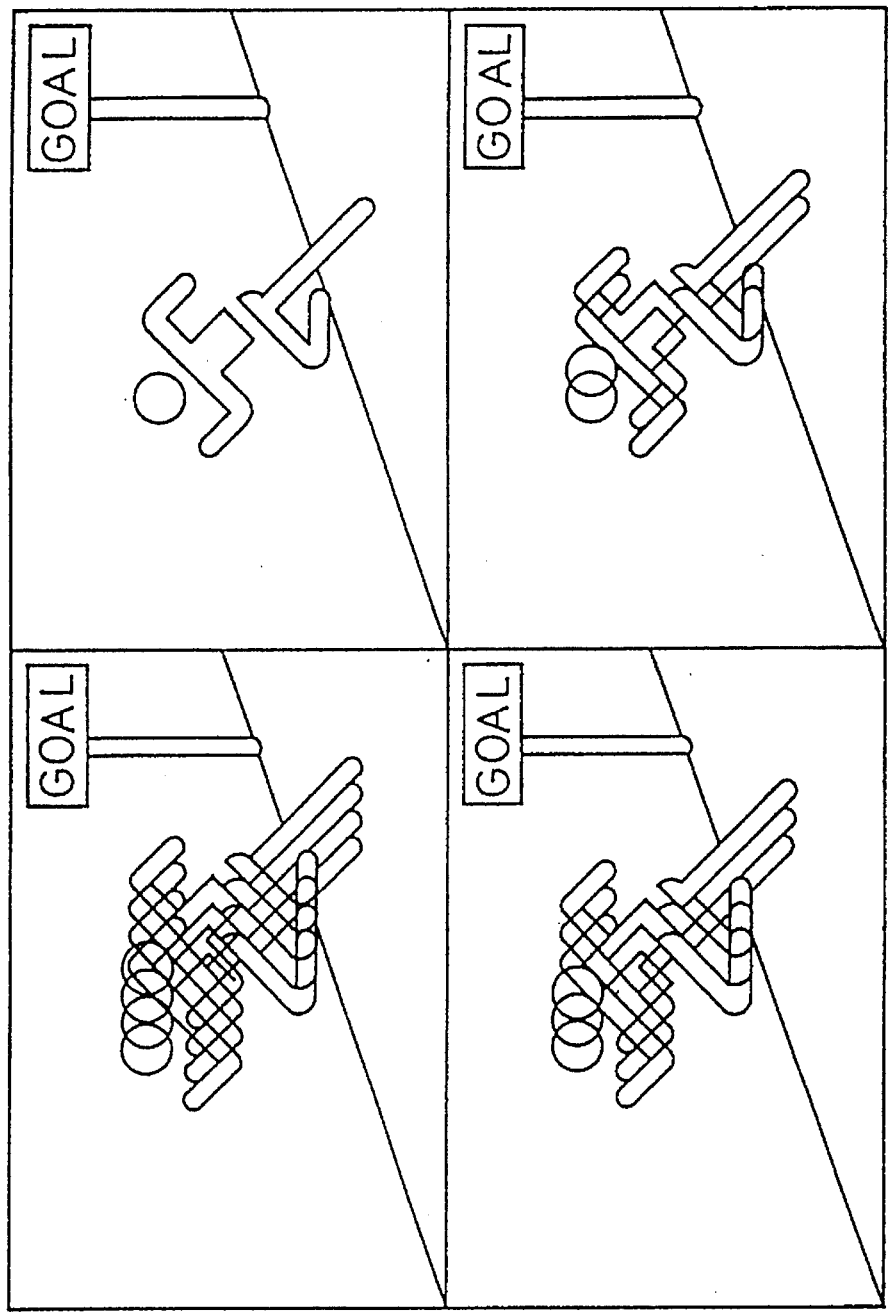
FIG. 30 shows a divided image plane displayed in the multi monitor mode.

FIG. 30 shows a display image plane provided in the above-described multi monitor mode. The image plane is divided into four. Each image plane shows an image based on a control value (shutter speed in the figure) obtained by shifting the initial control value by a predetermined value.

Figure 31:
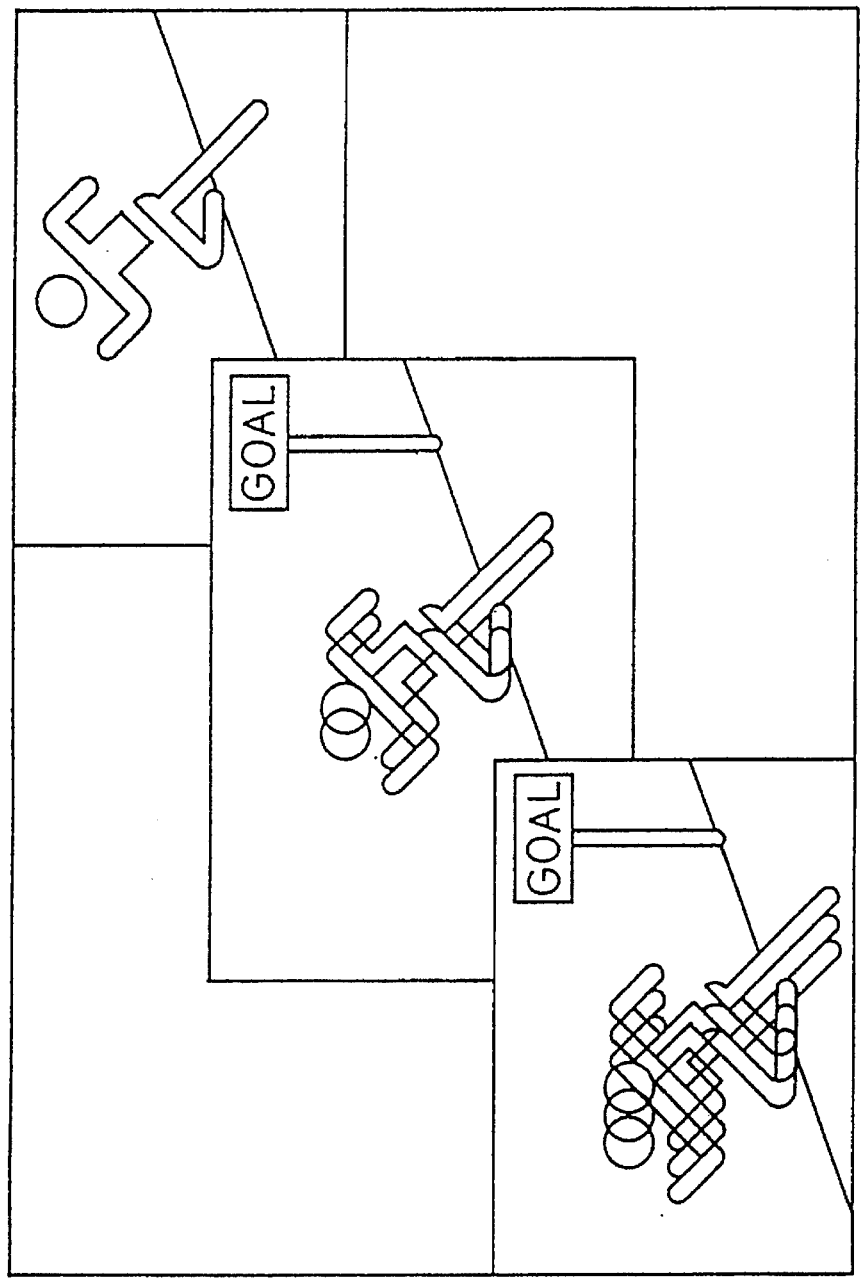
FIG. 31 shows an image plane divided into three.

FIG. 31 also shows a display image plane provided in the multi monitor mode. The image plane is divided into three, and the arrangement of the divided images are different from that of FIG. 30.

Figure 32:
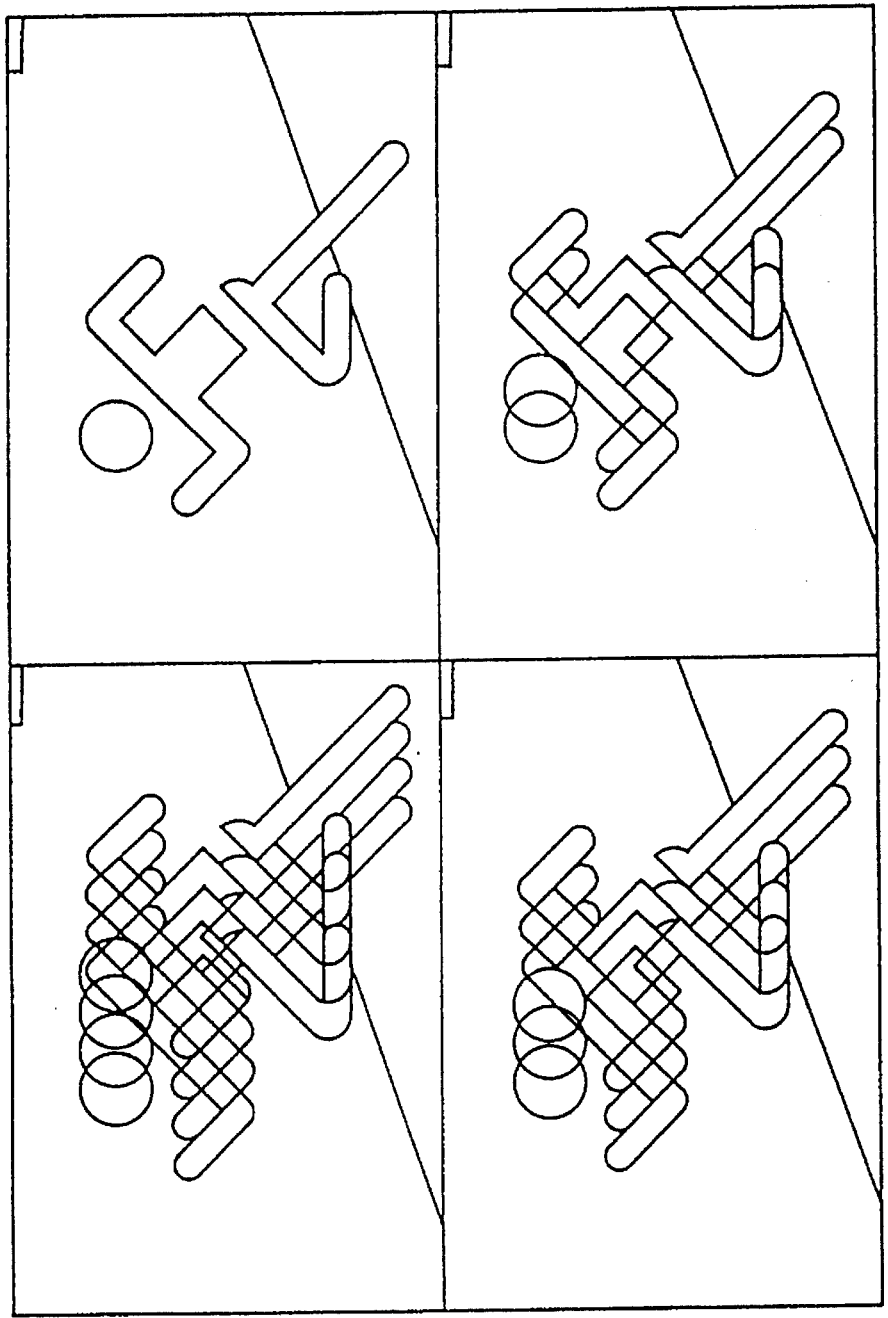
FIG. 32 shows a divided image plane where enlarged images are displayed.

FIG. 32 shows an image plane divided in a similar manner to that of FIG. 30. Each divisional image plane displays an enlarged evaluation area.

Figure 33:
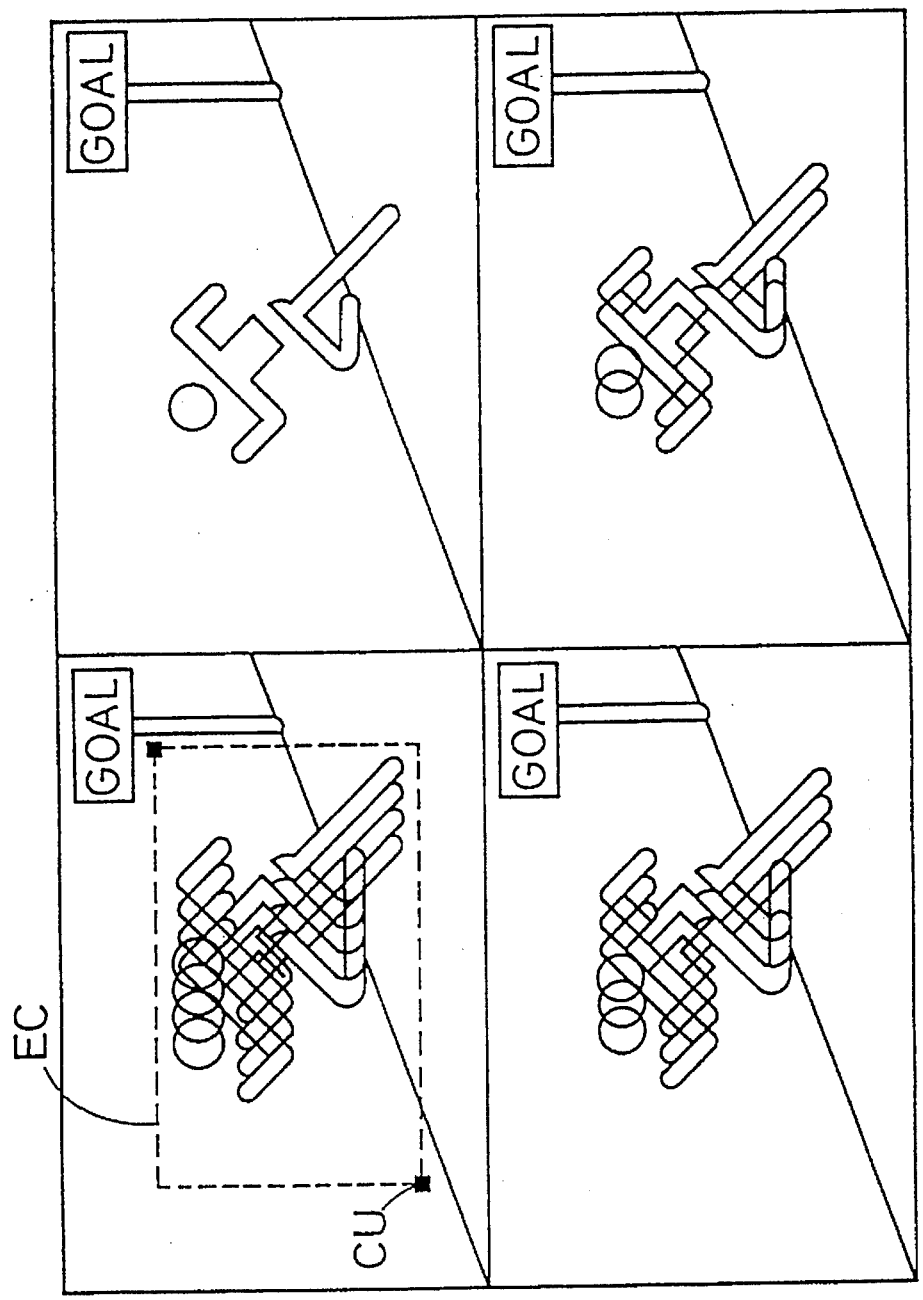
FIG. 33 shows a manner of specifying an area with a cursor.

FIG. 33 shows a manner in which an area EC to be enlarged is specified by a cursor CU.

Figure 34:
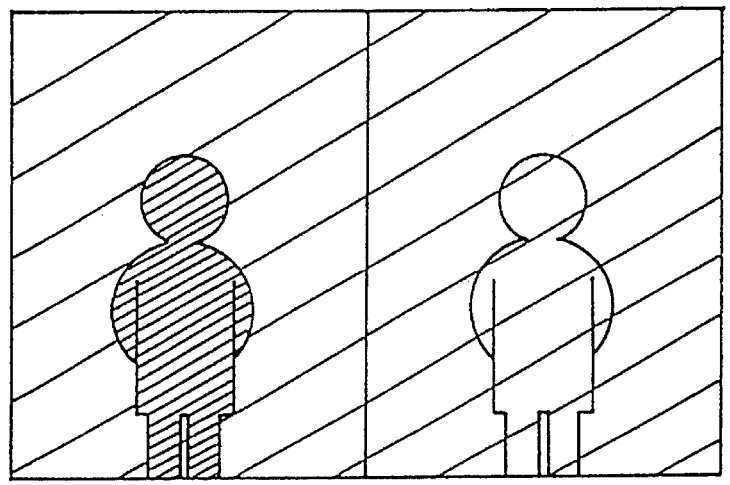
FIG. 34 shows a multi monitor image plane in a flash simulation.

FIG. 34 shows an example of a multi monitor image plane (divided into two) in the flash simulating routine of FIG. 25. Since flash light reaches only a close subject, the brightness of the background does not change and only the brightness of a close subject increases. For example, a person is dark as shown in the left image plane of the figure in photographing under a backlight condition; it can be monitored in the right image plane that the person becomes brighter by emitting the flash.

Figure 35:
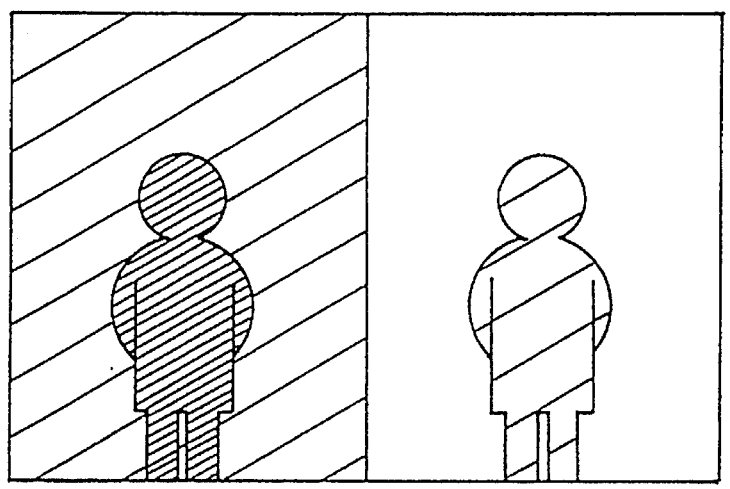
FIG. 35 shows a multi monitor image plane in an exposure compensation simulation.

FIG. 35 shows an example of a multi monitor image plane (divided into two) provided at the time of the printing density selection in the exposure compensation simulating routine of FIG. 26 and in the appreciation condition simulating routine of FIG. 27. In each simulating routine, different from the time of actual flash emission, the entire image plane becomes darker or brighter with the shade of the image plane being maintained. In the exposure compensation simulating routine, an image is monitored which is obtained by changing the exposure value Ev by shifting the aperture value Av and shutter speed Tv. To determine the printing density, an image is monitored which is obtained by shifting the aperture value Av and shutter speed Tv by an amount corresponding to the film latitude.

Figure 36:
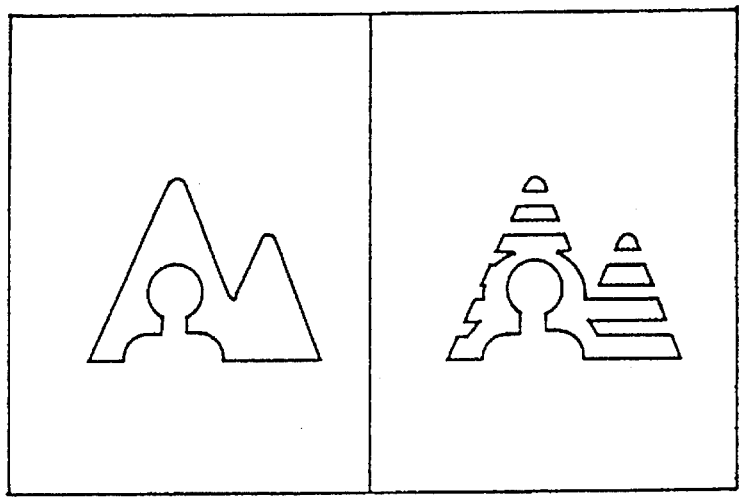
FIG. 36 show a multi monitor image plane where images based on different aperture values are displayed.
Figure 37:
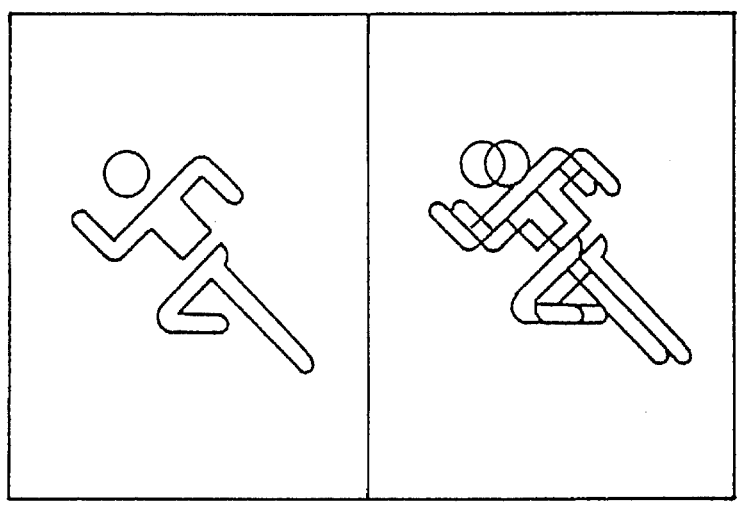
FIG. 37 shows a multi monitor image plane where images based on different shutter speed are displayed.

FIG. 36 shows two image planes based on different taking lens apertures. In the right image plane, the background is unsharp compared to in the left image plane. FIG. 37 show two image planes based on different shutter speeds.

An SLR camera where changeover between an optical view finder and the EVF is possible will hereinafter be described as an example of application of the EVF to an SLR camera.

First, changeover mechanism will be described.

Figure 38:
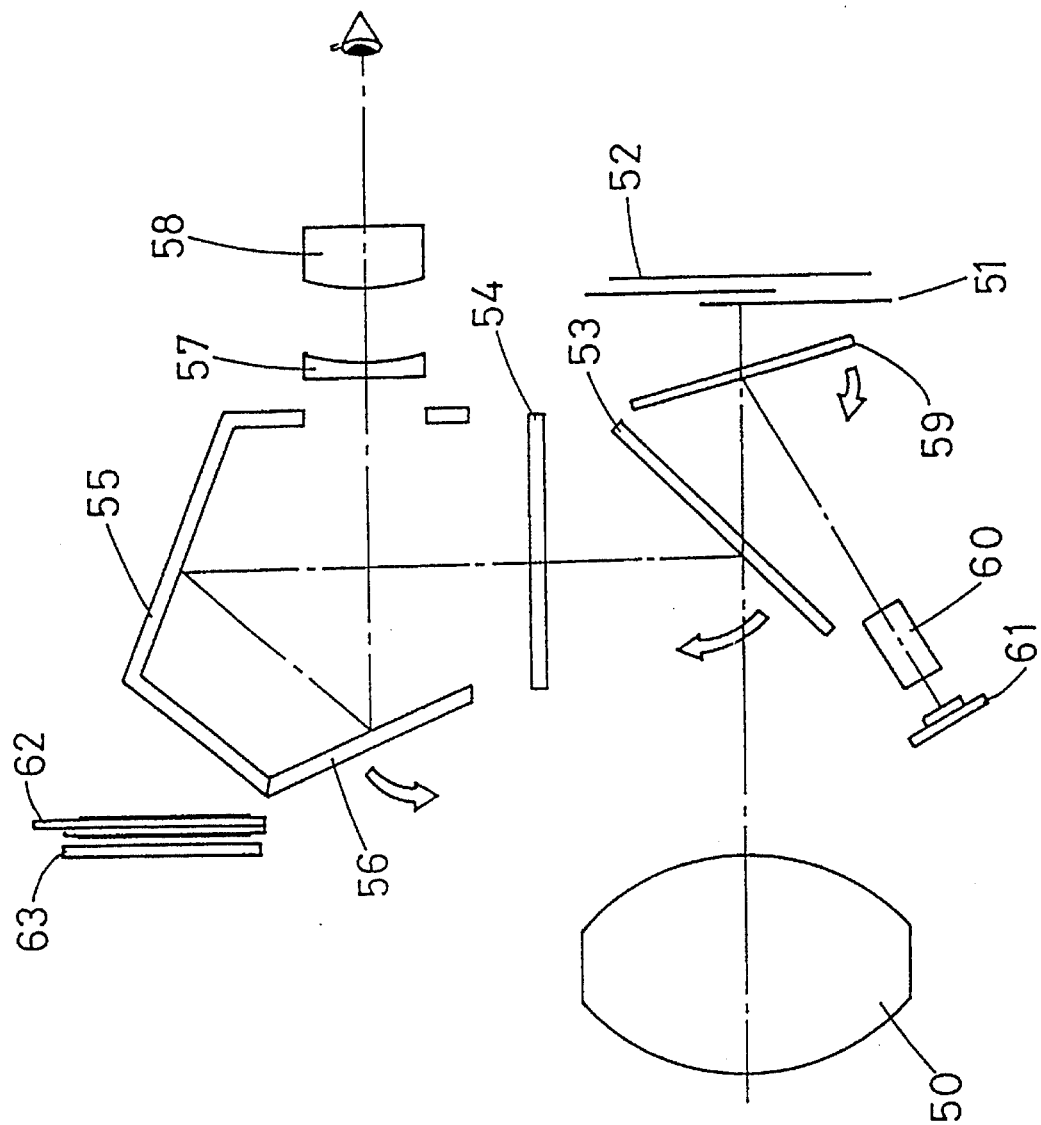
FIGS. 38 and 39 show a changeover mechanism of a finder using a hollow pentaprism.

FIG. 38 shows an embodiment using a hollow roof mirror equivalent to a pentagonal roof prism.

The upper portion is the finder side, while the lower portion is the taking lens (film) side. Numeral 50 is a taking lens, numeral 51 is a shutter, and numeral 52 is film.

In a case where the optical system is used as an optical view finder, light having passed through the taking lens 50 is reflected by a main mirror 53 toward the finder side to be formed into an image on a focusing screen 54. The image is viewed through mirrors 55 and 56 of a hollow roof mirror and the eyepieces 57 and 58.

On the other hand, light having passed a transparent or semi-transparent portion of the main mirror 53 is reflected by a sub mirror 59, passes through a relay lens 60 and is directed to a CCD 61, where image sensing is performed.

Exposure to the film 52 is performed by raising the main mirror 53 in a direction of the arrow and opening the shutter 51. At this time, the sub mirror 59 may be raised, or if a semi-transparent mirror such as a Pellicle prism is used as the sub mirror 59, the mirror up of the sub mirror 59 is unnecessary. As a result, and image sensing can be performed during exposure.

Figure 39:
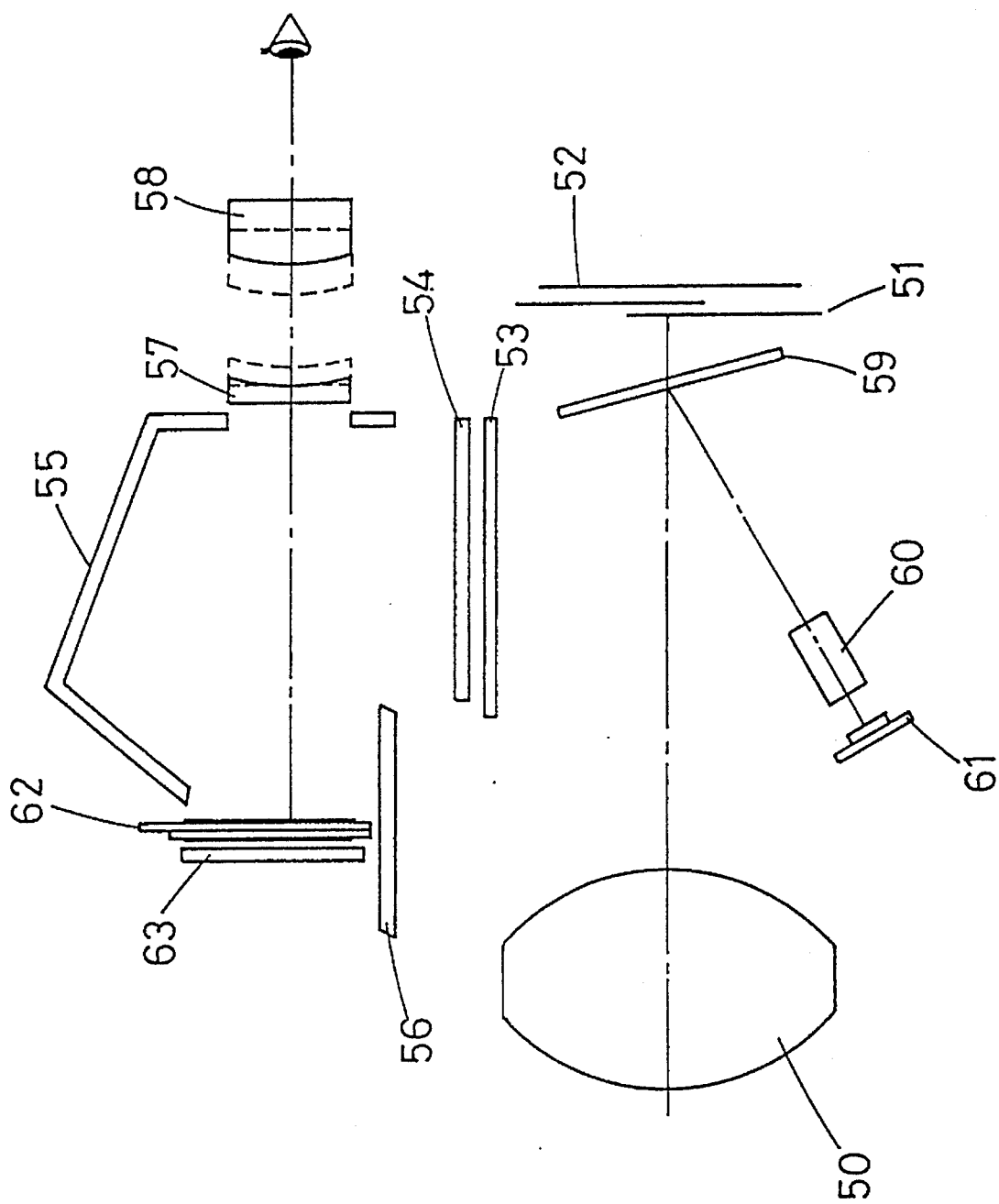

To shift the optical system from the condition of FIG. 38 to the EVF mode, first, the mirror 56 arranged in the finder optical path is rotated in a direction of the arrow of FIG. 38 as shown in FIG. 39. Then, a display device 62 and a lighting member 63 arranged in the upper front of the hollow roof mirror are moved into the finder optical path. Moreover, it is necessary to prevent light from the taking lens 50 from being directed to the optical system. For this prevention, light is completely intercepted by use of another light restricting plate during mirror-up of the main mirror, or the focusing screen 54 which is constituted by a liquid crystal display is made opaque during the mirror-up of the main mirror to prevent light from passing therethrough. If zooming and dioptric power adjustment are performed by moving the eyepieces 57 and 58 under this condition, an image sensed by the CCD 61 and displayed by the display device 61 can be viewed. With such an operation of the main mirror 53, the optical finder and EVF can be used alternatively.

Figure 40:
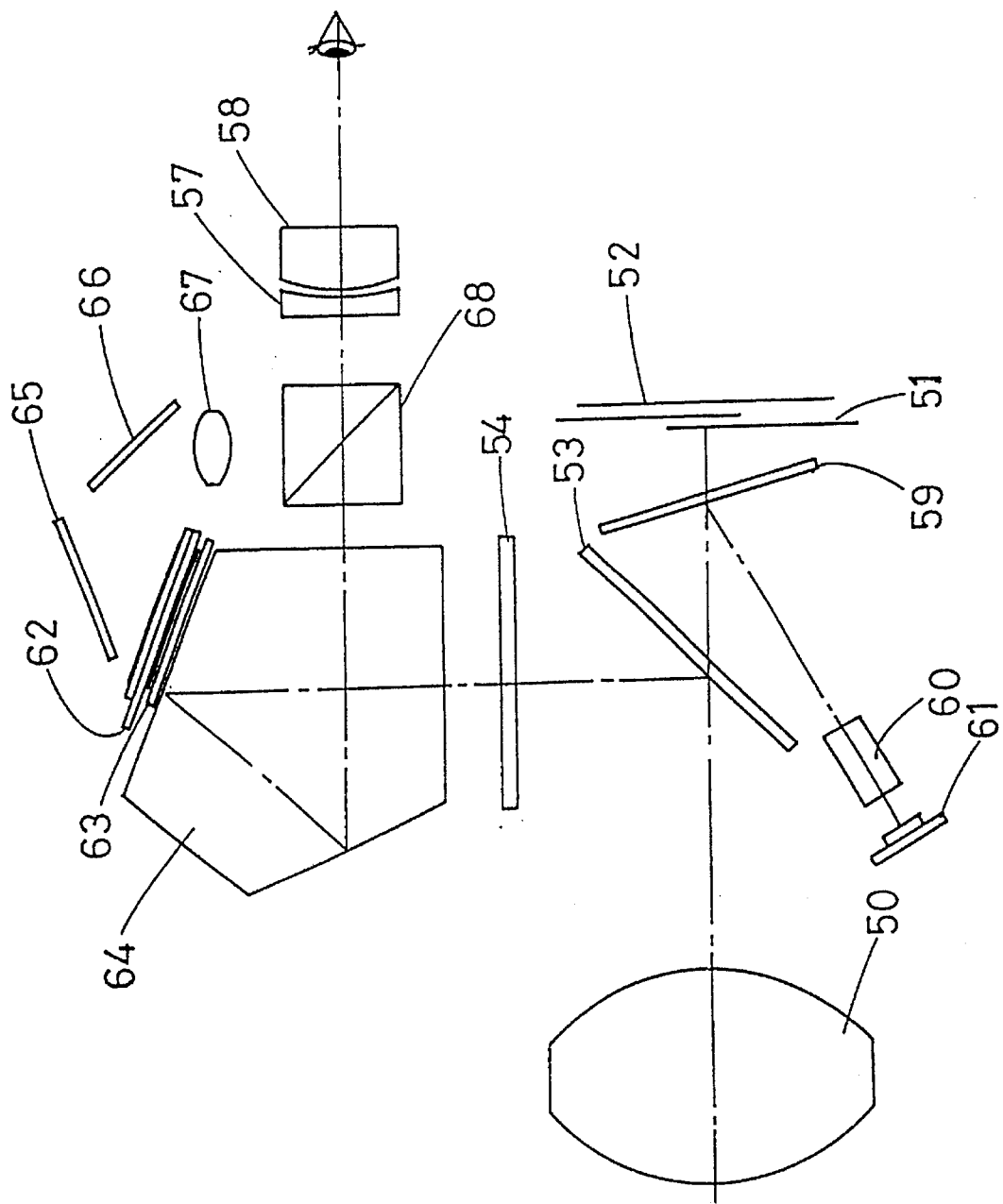
FIGS. 40 and 41 show a changeover mechanism of a finder using a pentaprism.

FIG. 40 shows an embodiment where a pentagonal roof prism is used and where a display device for the EVF is arranged in the vicinity of a roof surface of the prism which roof surface is located outside the finder optical path.

In a case where the optical system is used as an optical viewfinder, the working is almost the same as that of FIG. 38 except that a prism 64 is used. For changeover to the EVF, reflecting mirrors 65 and 66, a lens 67 and a dividing prism 68 are arranged in front of the eyepieces 57 and 58.

Figure 41:
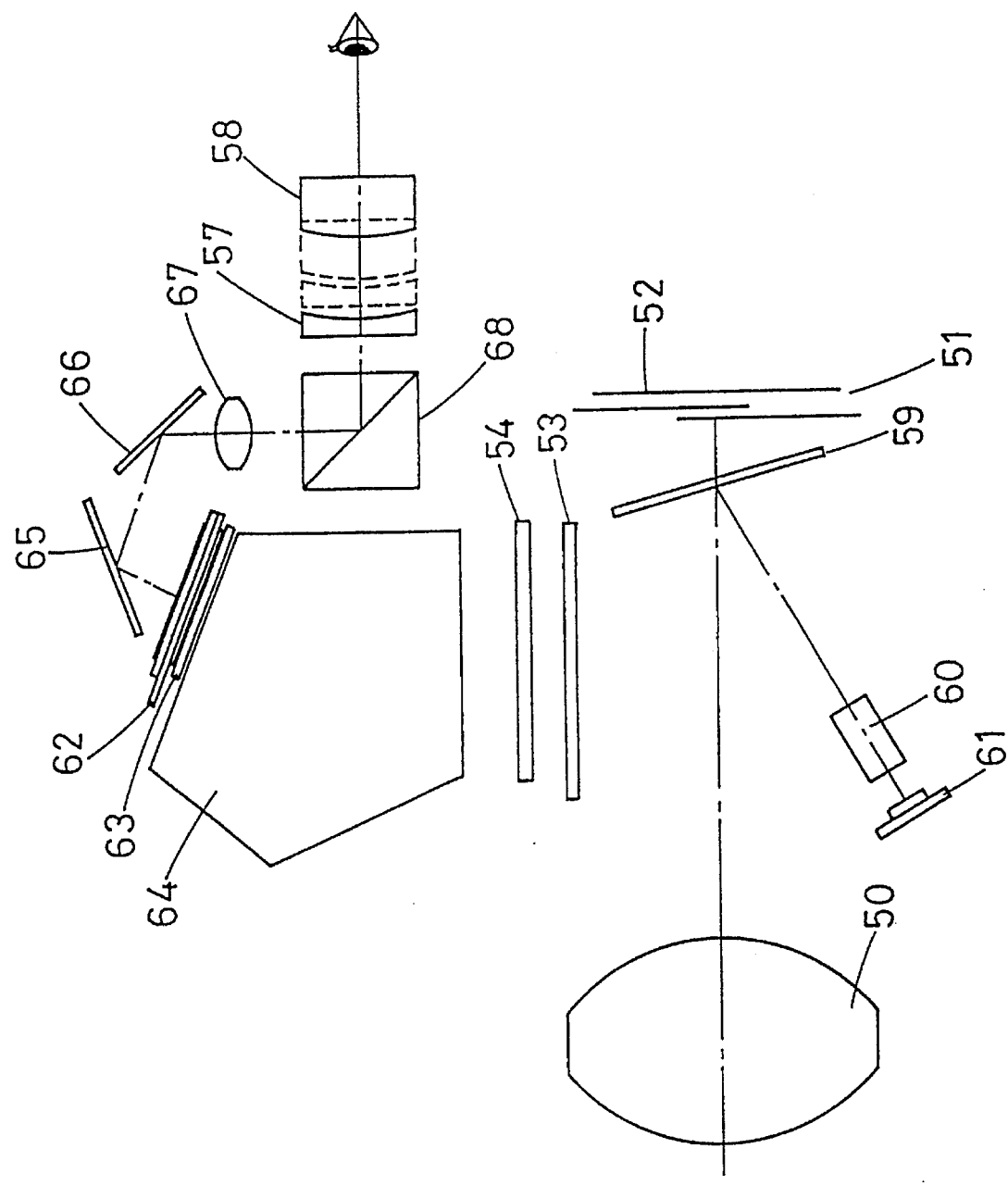

To shift the optical system from the condition of FIG. 40 to the EVF mode, the main mirror 53 is raised as shown in FIG. 41. Light is completely intercepted by use of another light restricting plate during mirror-up of the main mirror, or the focusing screen 54 which is constituted by a liquid crystal display is made opaque during the mirror-up of the main mirror to prevent light from passing therethrough. Then, an image sensed by the CCD 61 is displayed in the display device 62 on the roof surface of the pentaprism. The image is directed to the eyepieces 57 and 58 by use of at least one (two in this embodiment) reflecting mirror, the lens 67 and the spectral prism 68. At that time, the eyepieces 57 and 58 are moved in a manner similar to that of FIG. 39 to perform dioptric adjustment.

Figure 42:
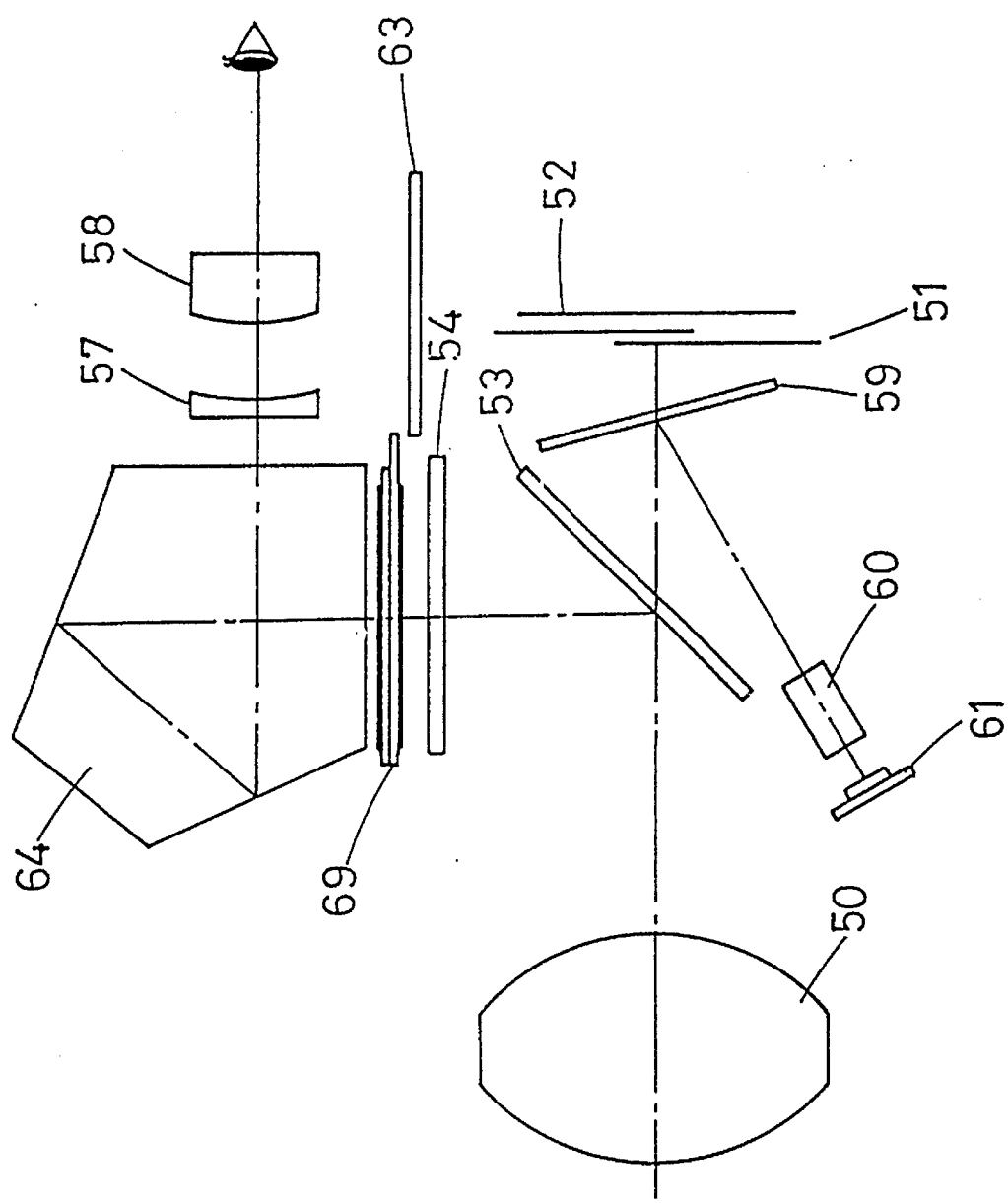
FIGS. 42 and 43 show a changeover mechanism of a finder using a transmission-type display device.
Figure 43:
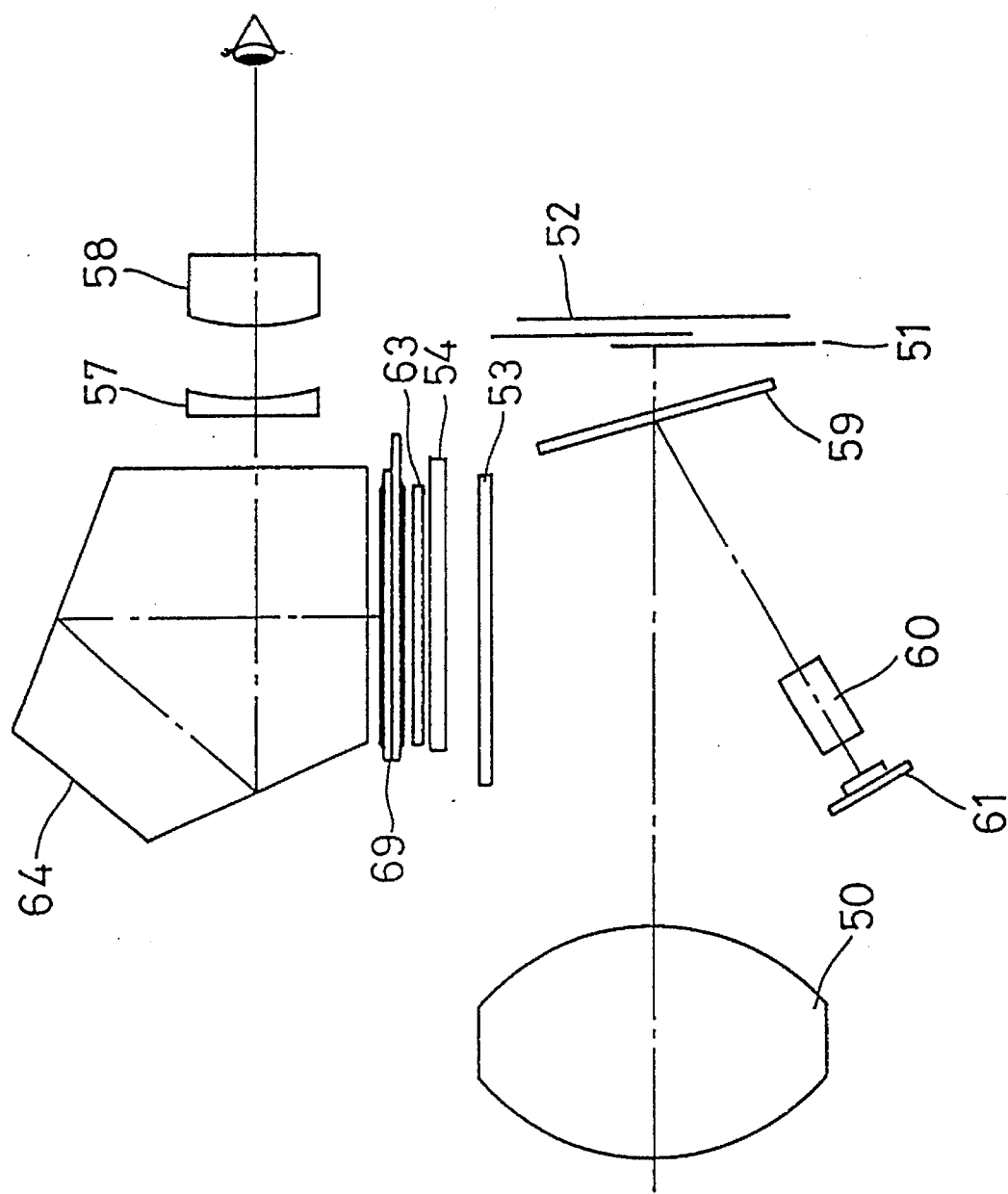

FIG. 42 shows an embodiment where a pentagonal roof prism is used similarly to FIG. 40 and where a transmission-type display device is used as a display device for the EVF.

In a case where the optical system is used as an optical viewfinder, the lighting member 63 is retrieved from the finder optical path, and light from the taking lens 50 is reflected by the main mirror 53 to form an image on the focusing screen 54. The image is viewed through a transmission-type display device 69, the prism 64 and the eyepieces 57 and 58. Exposure and image sensing are performed in a manner similar to that of FIG. 38.

For the shift to the EVF mode, the main mirror 53 is raised, and the lighting member 63 is inserted between the focusing screen 54 and the transmission-type display device 69 to perform backlighting to provide an image display in the transmission-type display device 69. At this time, the lighting member 63 prevents light from passing through the transparent portion of the main mirror 53.

Control performed in the SLR camera where changeover between the optical viewfinder and the EVF is possible will hereinafter be described.

Figure 44:
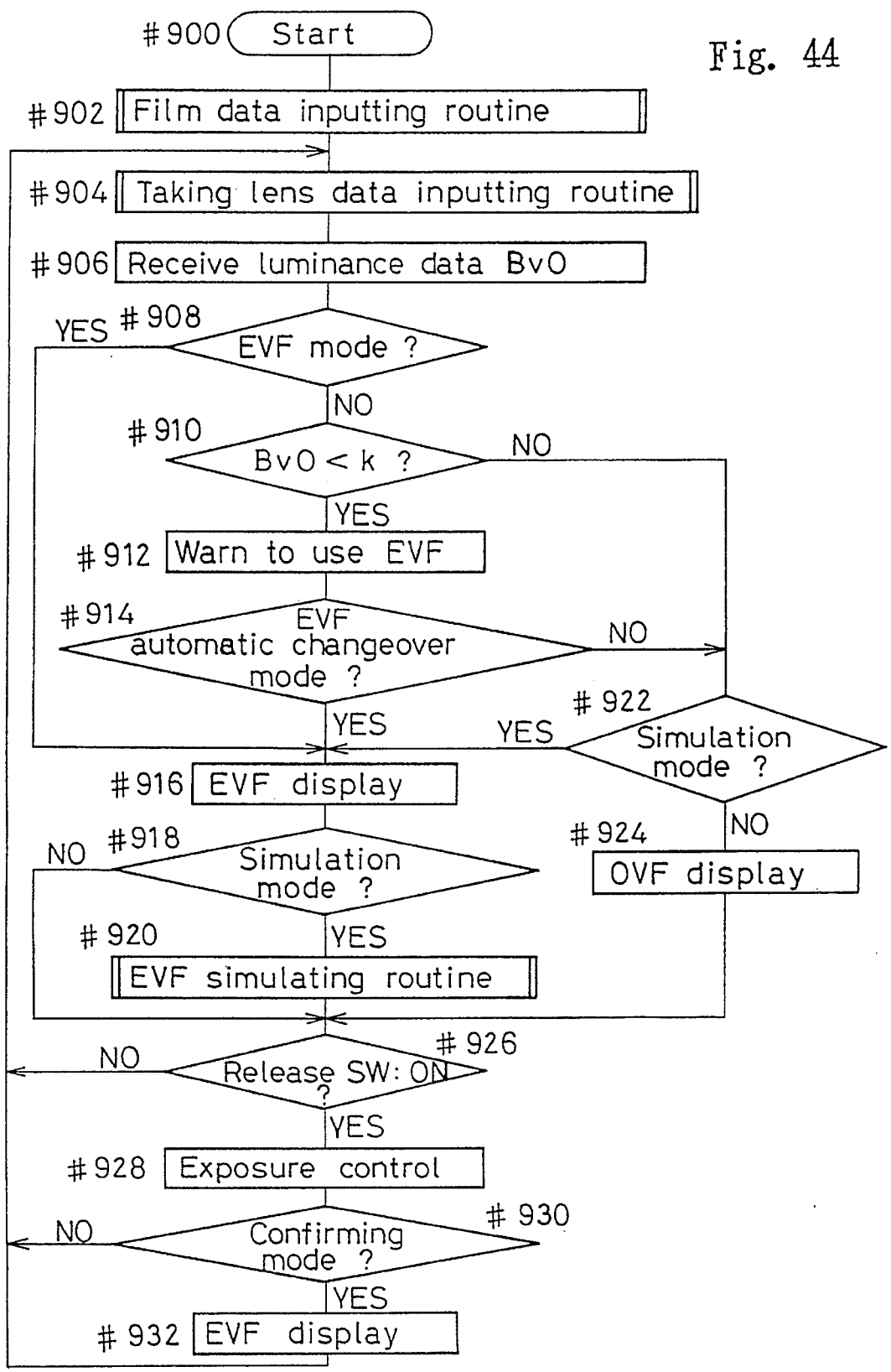
FIG. 44 is a flow chart of a finder changeover control.

FIG. 44 is a flow chart of a main routine which is started when the power is turned on and is ended when exposure control is completed.

The process is started when the power is turned on (step #900). A film data and a taking lens data are inputted to the camera at steps #902 and #904, respectively. Description of the film data inputting routine and that of the taking lens data routine will be omitted since they are the same as those of FIGS. 11 and 12. At step #906, a subject luminance data Bvo is received from a photometry system. At step #908, whether an EVF mode is ON or not is determined. When the EVF mode is ON, the process proceeds to step #916. When the EVF mode is not ON, whether the luminance Bvo is smaller than a predetermined value K or not is determined at step #910. When it is smaller, a display is provided to warn that it is desirable to provide a display in the EVF at step #912. When an EVF automatic changeover mode is ON at step #914, the process proceeds to step #916. When the luminance Bvo is equal to or larger than the predetermined value K at step #910 or when the EVF automatic changeover mode is not ON at step #914, whether a simulating mode is ON or not is determined at step #922. When it is ON, the process proceeds to step #916. When it is not OFF, an optical-viewfinder-type display is provided at step #924. Then, the process proceeds to step #926. At step #916, the above-described operation such as the mirror up of the main mirror is performed to provide an EVF-type display. At step #918, whether a simulating mode is ON or not is determined. When it is ON, a subsequently-described EVF simulating routine is executed at step #920. When the simulating mode is not ON, the process proceeds to step #926. At step #926, whether the release switch is ON or not is determined. When it is not ON, the process returns to step #904. When it is ON, exposure control is performed in a well-known manner at step #928. At step #930, whether the monitoring mode is ON or not is determined. When it is not ON, the process returns to step #904. When it is ON, information on exposure control is read and a display of an exposure condition is performed at step #932. Then, the process returns to step #904.

In the EVF simulating routine executed at step #920 of FIG. 44, which is similar to the monitoring routine of FIG. 20, the shutter speed or the aperture value is changed, and the effect by the change is evaluated. The evaluation results are shown in divisional image plane as shown in FIGS. 30 and 31. If the divisional image planes are so small that images displayed therein are not clearly viewed, the display may be provided in such a manner that several image planes are successively displayed every predetermined period of time.

Figure 45:
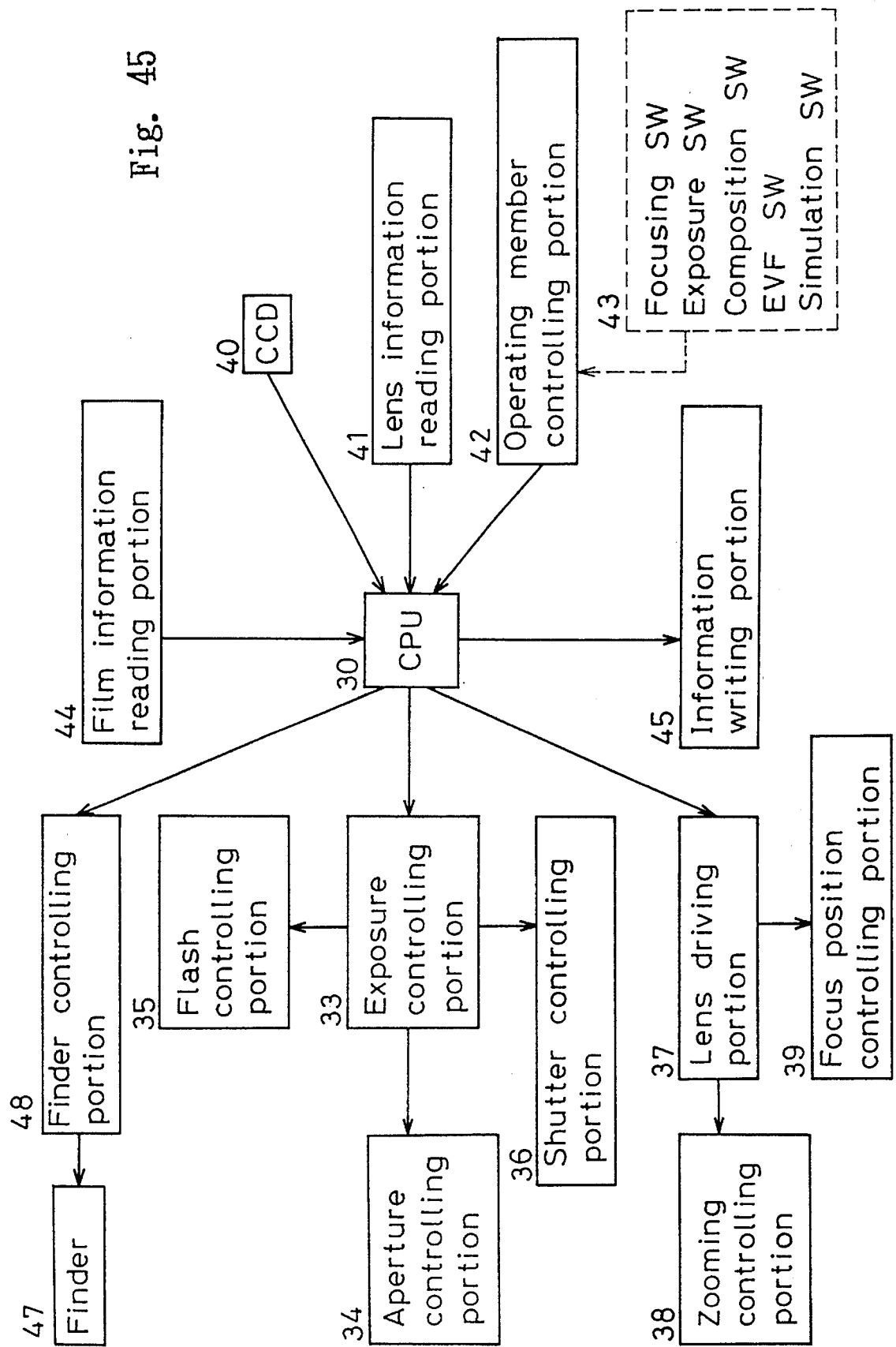
FIG. 45 is a block diagram of a single-lens reflex camera where finder changeover is possible.

FIG. 45, which corresponds to the previously-mentioned FIG. 22, is a block diagram of the SLR camera where changeover between the optical viewfinder and the EVF is possible. Instead of the EVF controlling portion 31, a finder controlling portion 46 is provided for control of the EVF and the optical viewfinder and changeover therebetween. Instead of the EVF 32, a finder 47 is provided. To the switches 43, an EVF changeover switch and a simulation switch are added.

Obviously, many modifications and variations of the present invention are possible in light of the above teachings. It is therefore to be understood that within the scope of the appended claims, the invention may be practiced other than as specifically described.

What is claimed is:

1. A camera comprising:
   an image sensor which receives light incident from an object to be photographed and outputs object image data;
   a viewfinder for displaying object images by means of the object image data; and
   a circuit which controls said viewfinder to display simultaneously a plurality of object images of the same object, each of which corresponds to a respective different exposure value.

2. A camera according to claim 1, wherein the exposure value is an aperture value.

3. A camera according to claim 1, wherein the exposure value is a shutter speed.

4. A camera according to claim 1, wherein the exposure value is a combination of an aperture value and a shutter speed.

5. A camera according to claim 1, wherein the exposure value is an amount of ambient light.

6. A camera according to claim 1, wherein the exposure value is an amount of electronic flash light.

7. A camera according to claim 1, wherein the exposure value is a combination of an amount of ambient light and an amount of electronic flash light.

8. A camera comprising:
   an image sensor which receives light incident from an object to be captured and outputs object image data;
   a viewfinder for displaying an object image by means of the object image data; and
   a circuit which controls said viewfinder to display sequentially a plurality of object images of the same object, each of which corresponds to a respective different exposure value.

9. A camera according to claim 8, wherein the exposure value is an aperture value.

10. A camera according to claim 8, wherein the exposure value is a shutter speed.

11. A camera according to claim 8, wherein the exposure value is a combination of an aperture value and a shutter speed.

12. A camera according to claim 8, wherein the exposure value is an amount of ambient light.

13. A camera according to claim 8, wherein the exposure value is an amount of electronic flash light.

14. A camera according to claim 8, wherein the exposure value is a combination of an amount of ambient light and an amount of electronic flash light.

15. A camera comprising:
    an image sensor which receives light incident from an object to be captured and outputs object image data;
    means for controlling a reset time of said image sensor to output various object image data for the same object, each of which corresponds to a respective different exposure value;
    a memory which stores said object image data;
    a viewfinder for displaying an object image by means of the object image data; and
    a circuit which controls said viewfinder to display simultaneously a plurality of images of the same object.

16. A camera comprising:
    an image sensor which receives light incident from an object to be captured and outputs object image data;
    means for controlling a reset time of said image sensor to output various object image data for the same object, each of which corresponds to a respective different exposure value;
    a memory which stores said object image data;
    a viewfinder for displaying an object image by means of the object image data; and
    a circuit which controls said viewfinder to display sequentially a plurality of images of the same object.

* * * * *